(12) United States Patent
Shimura et al.

(10) Patent No.: US 6,295,569 B1
(45) Date of Patent: *Sep. 25, 2001

(54) STORAGE APPARATUS

(75) Inventors: Soichi Shimura; Hideki Nishimoto; Shigeyoshi Tanaka, all of Kawasaki; Shigeru Kagawa, Inagi, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,382

(22) Filed: Jul. 11, 1997

Related U.S. Application Data

(63) Continuation-in-part of application No. 08/791,261, filed on Jan. 30, 1997, now abandoned.

(30) Foreign Application Priority Data

May 20, 1996 (JP) .................................................... 8-124489
Apr. 21, 1997 (JP) .................................................... 9-103070

(51) Int. Cl.[7] ............................................... G06F 13/00
(52) U.S. Cl. ............................... 710/129; 711/4; 713/300; 369/44.31
(58) Field of Search .................................. 395/309, 311, 395/750.01, 750.03, 750.08; 711/4; 369/44.11, 44.31; 710/129, 131; 713/300, 320, 340

(56) References Cited

U.S. PATENT DOCUMENTS

| | | | |
|---|---|---|---|
| 4,630,751 | * 12/1986 | Saito | 220/334 |
| 5,230,056 | * 7/1993 | Hoshina | 713/340 |
| 5,375,076 | * 12/1994 | Goodrich et al. | 364/708.1 |
| 5,513,069 | * 4/1996 | Ohgami et al. | 361/685 |
| 5,579,201 | * 11/1996 | Karageozian | 361/119 |
| 5,627,449 | * 5/1997 | Fujiki | 320/5 |
| 5,652,891 | * 7/1997 | Kitamura et al. | 713/324 |
| 5,694,293 | * 12/1997 | Seto et al. | 361/687 |
| 5,928,336 | * 7/1999 | Takeuchi | 710/1 |
| 6,078,109 | * 6/2000 | Yanagisawa | 307/18 |

FOREIGN PATENT DOCUMENTS

| | | |
|---|---|---|
| 6020244 | 1/1994 | (JP) . |
| 6139682 | 5/1994 | (JP) . |
| 7029299 | 1/1995 | (JP) . |
| 7093954 | 4/1995 | (JP) . |
| 7114770 | 5/1995 | (JP) . |

* cited by examiner

*Primary Examiner*—Ario Etienne
(74) *Attorney, Agent, or Firm*—Greer, Burns & Crain, Ltd.

(57) ABSTRACT

A battery pack is detachably provided for a drive main body. When carrying, an interface card and a connector cable are detachably supported and fixed to the drive main body by a holder member, thereby packaging. A power source is supplied from an upper apparatus to a control IC circuit unit of a device via the interface card. Only when both of the power supply from the upper apparatus and the power supply from an external power source unit are detected, the power source from the external power source unit is supplied to a device circuit unit, thereby making the device circuit unit operative.

12 Claims, 30 Drawing Sheets

MEDIUM
INSERTING
DIRECTION

MEDIUM
INSERTING
DIRECTION

FIG. 13
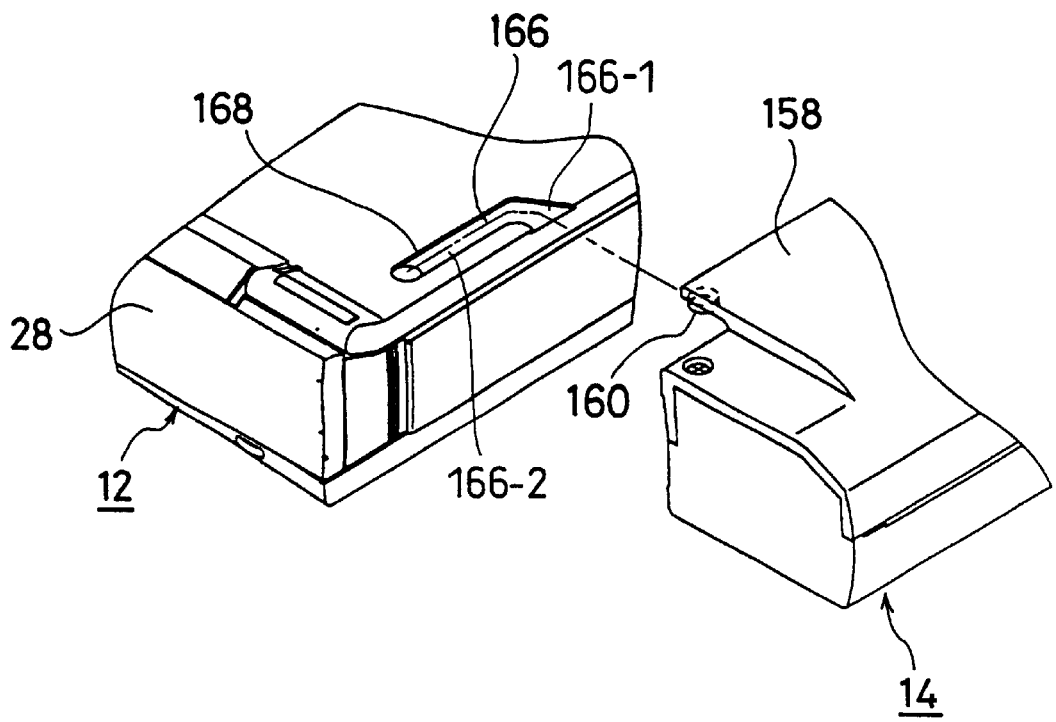
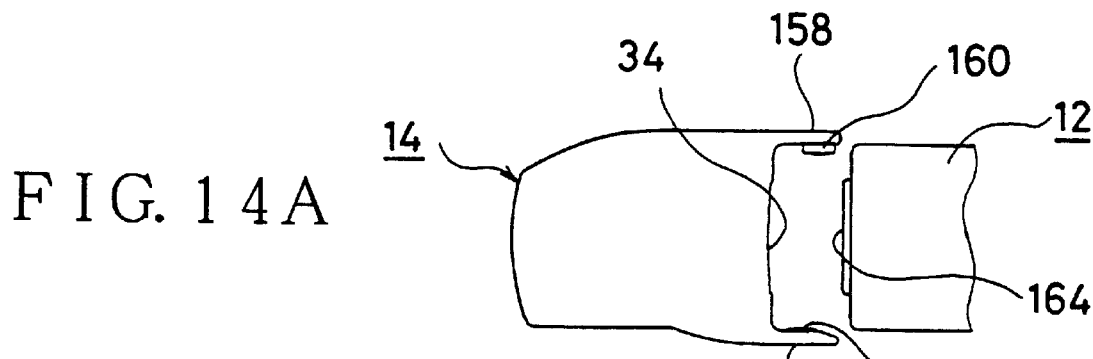
FIG. 14A
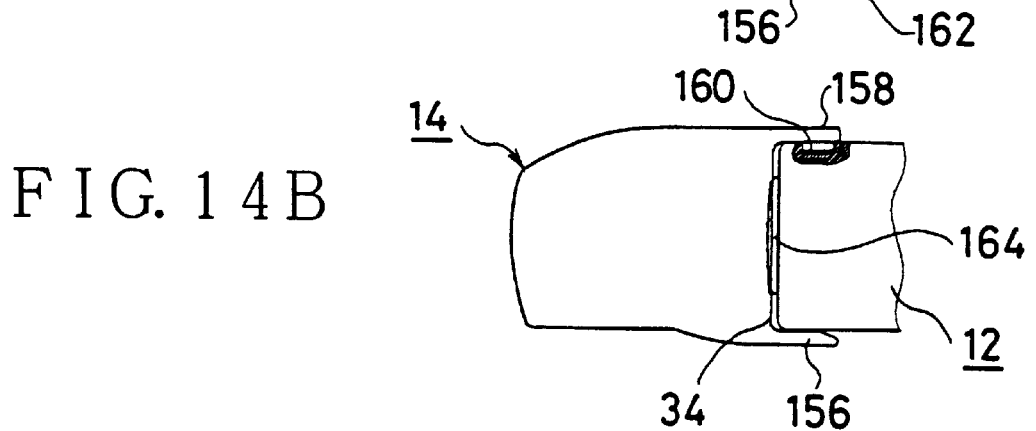
FIG. 14B

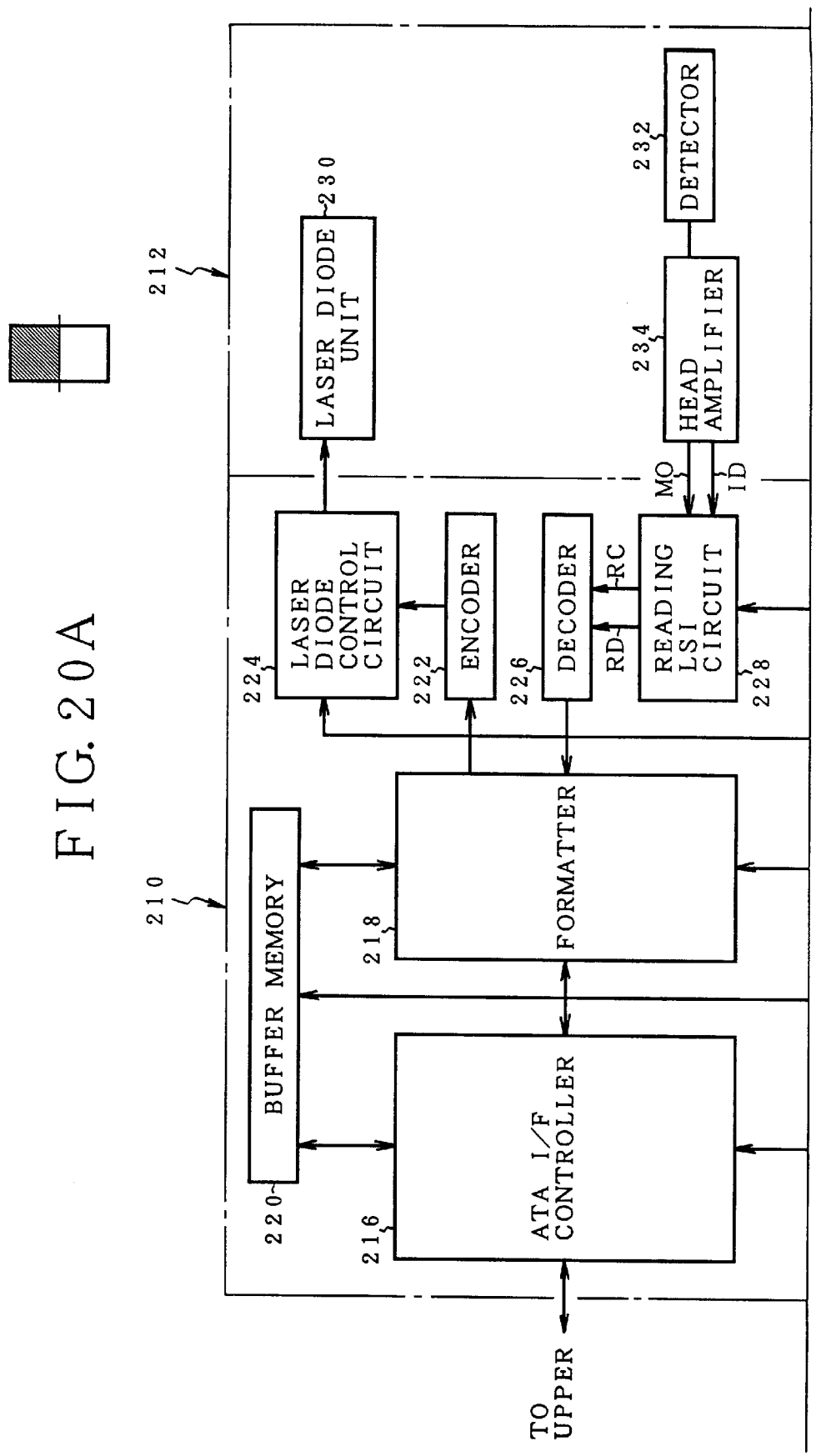

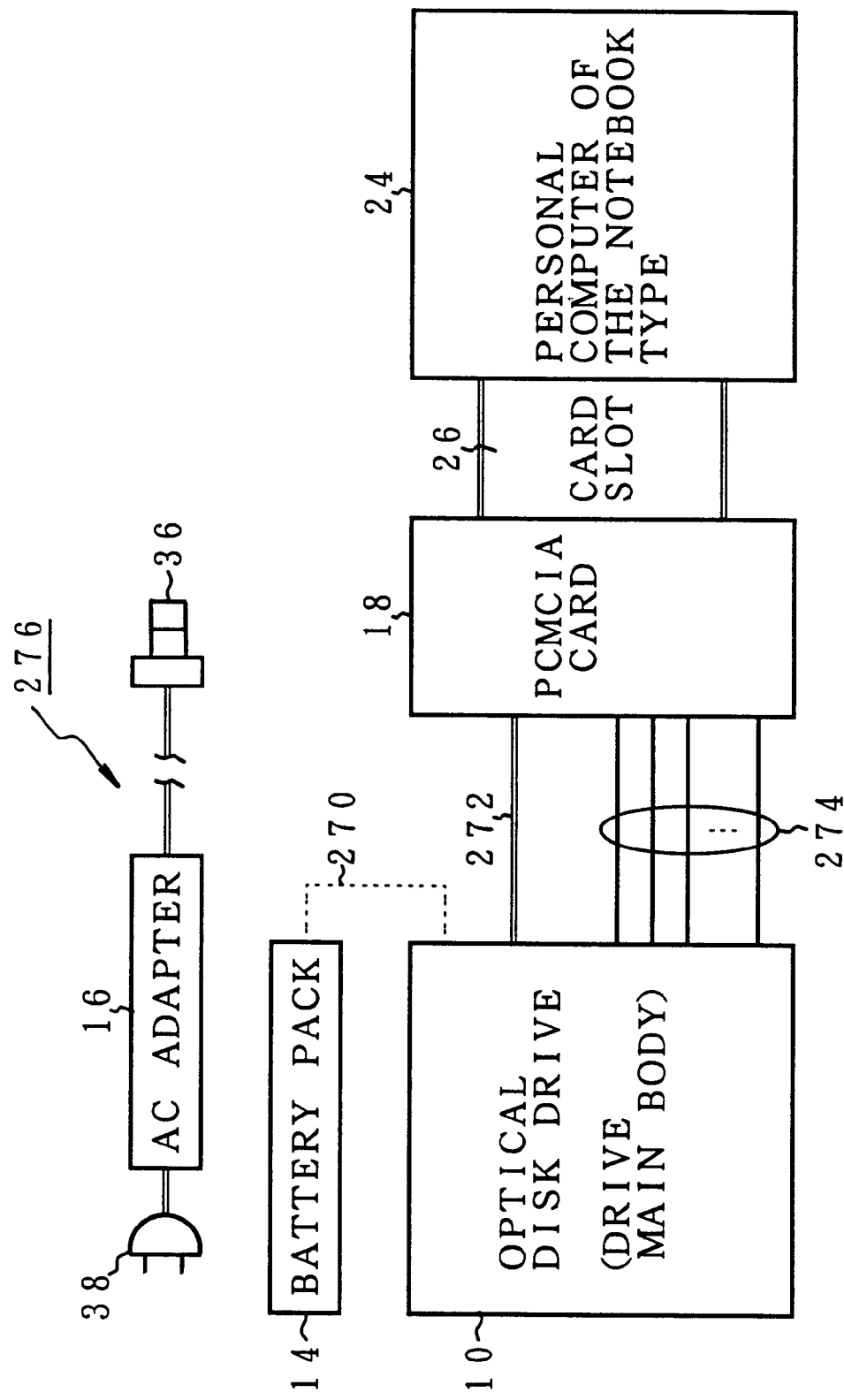

STORAGE APPARATUS

This application is a continuation-in-part of application(s) application Ser. No. 08/791,261 filed on Jan. 30, 1997, now abandoned.

BACKGROUND OF THE INVENTION

The present invention relates to a storage apparatus for optically recording and reproducing information to/from an interchangeable medium such as an MO cartridge or the like and, more particularly, to a storage apparatus in which a battery pack and an interface card for an upper apparatus are combined in addition to an apparatus main body and which is suitable to carry.

Attention is paid to an optical disk as a storage medium as a center of multi-media which is rapidly developing in recent years. For example, as for an MO cartridge of 3.5 inches, MO cartridges of 128 MB, 230 MB, and the like are provided. An optical disk drive using such an MO cartridge is provided as an external storage apparatus of a desk-top type personal computer. Further, it is strongly desired to use the optical disk drive in a notebook-sized personal computer having an excellent portability which is rapidly spread in recent years.

A conventional optical disk drive, however, is mainly used on the assumption that it is fixedly connected to the desk-top type computer as a prerequisite. When the optical disk drive is used as an external storage of the notebook-sized computer, there are various problems with respect to portability. For example, when the optical disk drive is used in the notebook-sized personal computer, accessories such as battery unit, interface unit, various connecting cables, and the like have to be also carried in addition to the optical disk drive. If the user forgets to carry any one of the accessories, the optical disk drive cannot be used. When the optical disk drive is carried with the accessories in addition to the notebook-sized personal computer, since the accessories are separate, it is inconvenient to enclose and take out the accessories into/from a bag or the like and it is difficult to use them. Further, since a medium insertion port of the optical disk drive is exposed on the front surface of a casing, when the optical disk drive is put as it is in the bag and is carried, there is a fear such that a foreign material enters from the medium insertion port during the carrying and when the optical disk drive is operated in such a state, the medium or drive is damaged.

When the optical disk drive is used as an external storage of the notebook-sized personal computer, the optical disk drive uses, for example, an ATA interface (AT attachment interface) and the notebook-sized personal computer uses a PCMCIA interface according to the PCMCIA (Personal Computer Memory Card International Association). Therefore, a converting circuit to obtain a compatibility between the ATA interface and the PCMCIA interface is necessary. When the interface converting circuit is provided in the optical disk drive or the notebook-sized personal computer, since it cannot be adapted to other interfaces, it lacks generality and the apparatus is complicated. The notebook-sized personal computer usually has a card slot for enabling a device to be connected from the outside by using a PC card. It is, therefore, desirable to provide the interface converting circuit which obtains a compatibility with the optical disk drive as a PC card. A card having a converting function between the ATA interface on the device side and the PCMCIA interface on the host side is called a PCMCIA card hereinbelow. In case of connecting the optical disk drive as a device side to the notebook-sized personal computer as a host side by using and inserting the PCMCIA card into the card slot of the notebook-sized personal computer, when a power source is supplied from the outside to only the device side, a current flows to the host side whose operation is stopped depending on a power source sequence, so that the current is unnecessarily consumed. When the power source is supplied from the outside to only the host side, a current flows to the device side whose operation is stopped and the current on the host side is also unnecessarily consumed similarly. Since the notebook-sized personal computer and the optical disk drive which is used as an external storage of the computer are made operative by the power source supplied from a battery unit, there is an inconvenience such that such a current consumption shortens a usable time by the battery.

Further, when the optical disk drive is used as an external storage of the notebook-sized personal computer by the power supply by the battery unit, a low battery voltage is detected and an abnormality is notified by a buzzer or a light-on of an LED since data is lost or the medium is damaged when the battery voltage on the device side is extinguished. There is, however, a case where the battery voltage is extinguished without being aware of the buzzer or LED light-on by the user, so that the battery is finished and the data or medium is damaged. There is also a case where even if the user is aware of the low battery voltage, the apparatus doesn't immediately enter the unusable state, he continues to use the computer, and after all, the battery voltage is extinguished and the data or medium is damaged.

SUMMARY OF THE INVENTION

According to the invention, a storage apparatus which is easy to carry with accessories is provided. A storage apparatus of the invention for this purpose comprises: an apparatus main body for optically recording and reproducing information to/from an interchangeable medium; a battery pack for supplying an operation power source from a built-in battery which is detachably provided in the apparatus main body; an interface card for connecting the apparatus main body to an upper apparatus; and a connector cable for connecting the apparatus main body and the interface card, wherein the interface card and the connector cable are detachably supported and fixed onto the apparatus main body by a holding member and they are packaged. As mentioned above, since the interface card and the connector cable are supported and packaged by the holding member to the apparatus main body to which the battery pack is attached, it is very convenient to enclose and take them out when they are carried. A situation such that the user forgets to carry any one of the accessories and the apparatus enters the unusable state doesn't occur.

The apparatus main body has a closable front cover (lid member) on the front surface of the apparatus in which a medium insertion port is opened. The front cover is rotatably pivotally supported on the lower side of the front surface of the apparatus. The front cover can certainly prevent foreign material from entering from the medium insertion port during the carrying of the apparatus and the apparatus and medium are damaged upon operation. The front cover is rotatably pivotally supported to a lower portion of the front surface of the apparatus via a hinge. The medium insertion port is supported at a position which is lifted from the installation surface of the apparatus main body in a state where the front cover is opened and is turned downward under the bottom surface of the apparatus main body. Consequently, the medium insertion port is lifted up from the surface of an installed desk or the like in a state where the front cover of the storage apparatus is opened, so that the medium can be easily inserted and ejected.

As an engagement structure of the apparatus main body and the battery pack, the battery pack comprises: a pack main body which is detachably attached to the side surface of the apparatus main body; a pair of pressing plates which are projected from the upper and lower portions of the pack main body toward the side surfaces of the apparatus main body and support the pack main body by sandwiching the apparatus main body from the upper and lower directions; a plug supporting unit extending from the rear portion of the pack main body to the rear surface direction of the apparatus main body; and a plug which is projected toward the inside of the plug supporting unit and is inserted into a jack hole of the apparatus main body. With such a structure, the battery pack can be certainly supported and fixed to the apparatus main body at three points by the pair of pressing plates and the insertion of the plug into the jack hole. Further, a guide knob is projected toward the inside of the pressing plate on the bottom side of the battery pack, a guide groove is formed on the bottom surface of the apparatus main body in correspondence with the guide knob, and the guide groove is communicated with an engaging guide groove which forwardly extends subsequent to a leading guide groove in the side surface direction. By guiding and moving the guide knob along the guide groove, the supporting fixing state of the battery pack by three points of the pair of pressing plates and the insertion of the plug into the jack hole is formed. The cover member for the medium insertion port of the apparatus main body is constructed by the battery pack and the battery pack can be also detachably provided on the front surface of the apparatus on which the medium insertion port of the apparatus main body is opened.

The invention can be also applied to all of the drives which function as storage apparatuses. In this case, the storage apparatus comprises: a drive unit for accessing information to a medium; a power jack for supplying a power source to the drive unit; an interface connector for connecting the drive unit to an upper apparatus; and further, a casing to which the drive unit, jack, and interface connector are attached. A battery pack which has a power plug to be connected to the power jack and supplies a power source from a built-in battery to the drive unit is also provided. Further, there are also provided: an interface card which is connected to an interface of an upper apparatus; an interface plug to be connected to the interface connector; and a connector cable for connecting the interface card and the interface plug. Moreover, there is also provided a holding member for detachably supporting and fixing the interface card, interface plug, and connector cable onto the casing, thereby packaging them.

According to the invention, there is provided a storage apparatus which prevents an unnecessary current flow to a stop side when a power source is supplied to either the host side or the device side. The storage apparatus of the invention comprises: an apparatus main body for optically recording and reproducing information to/from an interchangeable medium; an external power source unit for supplying a power source to the apparatus main body; and an interface card (PCMCIA card) having a converting circuit for connecting a first interface (ATA interface) of the apparatus main body and a second interface (PCMCIA interface) of an upper apparatus. The apparatus main body has: an interface controller which operates by receiving a power supply from the upper apparatus via the interface card; a device circuit unit which operates by receiving a power supply from an external power source unit except the interface controller; and a switching circuit for supplying the power source from the external power source unit to the device circuit so as to make the device circuit operative only when both of the power supply from the upper apparatus via the interface card and the power supply from the external power source unit are detected. When the power source is supplied only to the device side serving as an apparatus main body, therefore, since the control circuit unit on the device side which operates by the power supply from the host side is stopped and the interface function is also stopped, the current flow from the device side to the host side through the interface signal line can be prevented. With respect to the power supply only to the host side, since the power from the host side is supplied as a control power to the control circuit unit on the device side and the interface between the device and the host normally operates, the current flow from the host to the device does not occur. As another form to prevent an unnecessary current flow between the device and the host, the interface card can also have a power monitoring circuit for switching the converting circuit to an enable state only when both of the power supply from the external power source unit to the apparatus main body and the power supply from the upper apparatus are detected. In this case, with respect to the power supply from either the device side or the host side, since the converting circuit of the interface card enters a disable state and the interface signal line is disconnected, the unnecessary current flow from the power supply side to the stop side by the interface signal line does not occur. Further, the apparatus main body has a power change-over switch for switching the power supply from the external power source unit and the power supply from the upper apparatus via the interface card. Consequently, even when the power source is supplied only to the host side, by switching the power change-over switch to the host side, the device side can be operated by the power supply to the upper apparatus side.

Further, according to the invention, there is provided a storage apparatus which prevents damages caused by an extinction of the battery voltage on the drive side. For this purpose, the battery pack has a monitoring circuit for detecting a drop of the capacity of the battery (low battery voltage) and outputting a battery abnormality detection signal. An output of the monitoring circuit is connected to the control circuit unit of the apparatus main body by an exclusive-use signal line and is connected to the upper apparatus via the interface card. The control circuit unit of the apparatus main body stops the reading and writing operations for the medium when the battery abnormality detection signal is received. Further, the control circuit unit of the apparatus main body allows the medium to be ejected after the battery abnormality detection signal was received and the reading and writing operations for the medium were stopped. Consequently, even if the battery voltage extinction occurs on the device side during the use of the apparatus, the reading and writing operations of the device are automatically stopped and the medium is ejected, so that the data and the medium can be certainly prevented from being damaged and a high reliability is obtained. Since the battery abnormality detection signal is also notified to the host side by the interface signal line, even if the device side is stopped, its cause is recognized and the battery voltage extinction can be displayed on a display or the like.

Further, according to the invention, there is provided a storage apparatus in which an optical disk drive is set to a general type and whether the drive is attached to a drive slot or the like of the apparatus main body and is used or the drive is connected via a cable by an interface card and is used can be selected in correspondence to an interface function that is equipped for an upper apparatus such as a personal computer or the like.

For this purpose, a storage apparatus of the invention is characterized by comprising: a drive of a general type for accessing information to a replaceable medium; and an interface unit which is detachably provided for the drive and connects an external power supply unit and an interface card of an upper apparatus to the drive. The interface unit comprises: a power jack which supports and fixes a casing by connecting a connector for driving to an interface connector provided for the drive and in which a power plug of the external power supply unit is connected to a rear side of the casing; a connector for a card for connecting an interface card by a connector cable; and a power switch for switching a power supply from a connector for a card and a power supply from the power jack. A battery pack which is detachably provided for the drive and supplies an operating power source from a built-in battery can be connected as an external power supply unit to the interface unit. The battery pack comprises: a pack main body which is detachably attached to the side surface of the drive; a pair of pressing plates which are projected from upper and lower positions of the pack main body toward the side surface of the drive and sandwich the drive from the upper and lower positions, thereby supporting the pack main body; a plug supporting portion extending from a rear portion of the pack main body in the rear surface direction of the drive; and a plug which is projected to the inside of the plug supporting portion and is inserted into a jack hole of the drive main body, wherein the battery pack is supported and fixed to the drive at at least three points by the pair of pressing plates and the insertion of the plug into the jack hole. Further, an AC adapter for supplying a specified DC power source converted from an AC power source can be connected as an external power supply unit to the interface unit. In case of using the interface unit, the power supply from an upper apparatus by a card interface and the power supply from an AC adaptor or a jack for a DC plug by a battery pack can be switched as necessary. For example, when a personal computer as an upper apparatus is a portable type which is driven by a battery, by switching the power supply mode to the power supply from the jack for the DC plug, a reduction of a battery life of the upper apparatus when an external storage is used can be suppressed.

BRIEF DESCRIPTION OF THE DRAWINGS

FIG. 13 is an explanatory diagram of the assembly structure of the apparatus main body and the battery pack when they are seen by being taken along with the line XIII—XIII in FIG. 12;

FIGS. 14A and 14B are explanatory diagrams of an engagement of a guide groove of the bottom surface of the apparatus main body and a knob of the battery pack;

FIGS. 20A and 20B are circuit block diagrams of the apparatus main body of the invention;

FIG. 21 is a block diagram when the optical disk drive of the invention is connected to a personal computer;

DETAILED DESCRIPTION OF THE PREFERRED EMBODIMENTS

[Portable Structure]

Figure 1:
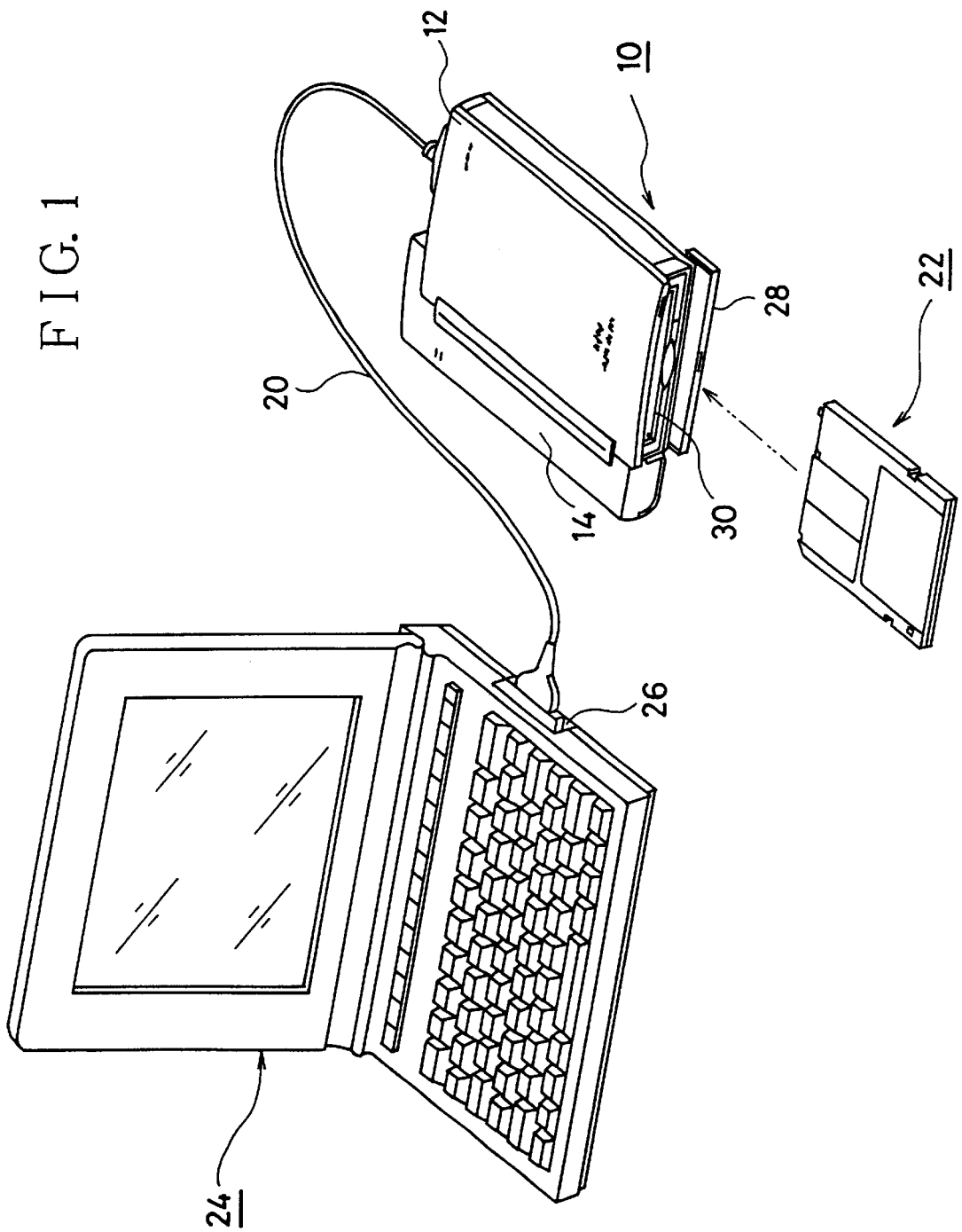
FIG. 1 is an explanatory diagram of a using form of the invention.

FIG. 1 is a diagram showing a using state of a storage apparatus, namely, an optical disk drive of the invention. An operating power source is supplied to an optical disk drive 10 from a battery pack 14 attached to the side of a drive main body 12. The drive main body 12 is connected to a card slot 26 of a notebook-sized personal computer 24 serving as a host side by a connector cable 20 for a card by using an interface card. A front cover 28 which functions as a lid member is provided in a front portion of the drive main body 12. By opening the front cover 28 to the lower side, a medium insertion port 30 is opened to the front surface. The front cover 28 is rotated to the bottom surface side of the drive main body 12, thereby upwardly lifting the front portion of the drive main body. An MO cartridge medium 22 is inserted into the medium insertion port 30 of the drive main body 12. When the MO cartridge medium 22 is loaded into the drive main body 12, the operator pushes the MO cartridge medium 22 to a specified position of the medium insertion port 30 by the hand, so that the MO cartridge medium is attached to an internal spindle motor. When the MO cartridge medium 22 is ejected out of the drive main body 12, by pressing an ejection switch provided for the drive main body 12, the MO cartridge medium is ejected by a built-in ejection motor.

Figure 2:
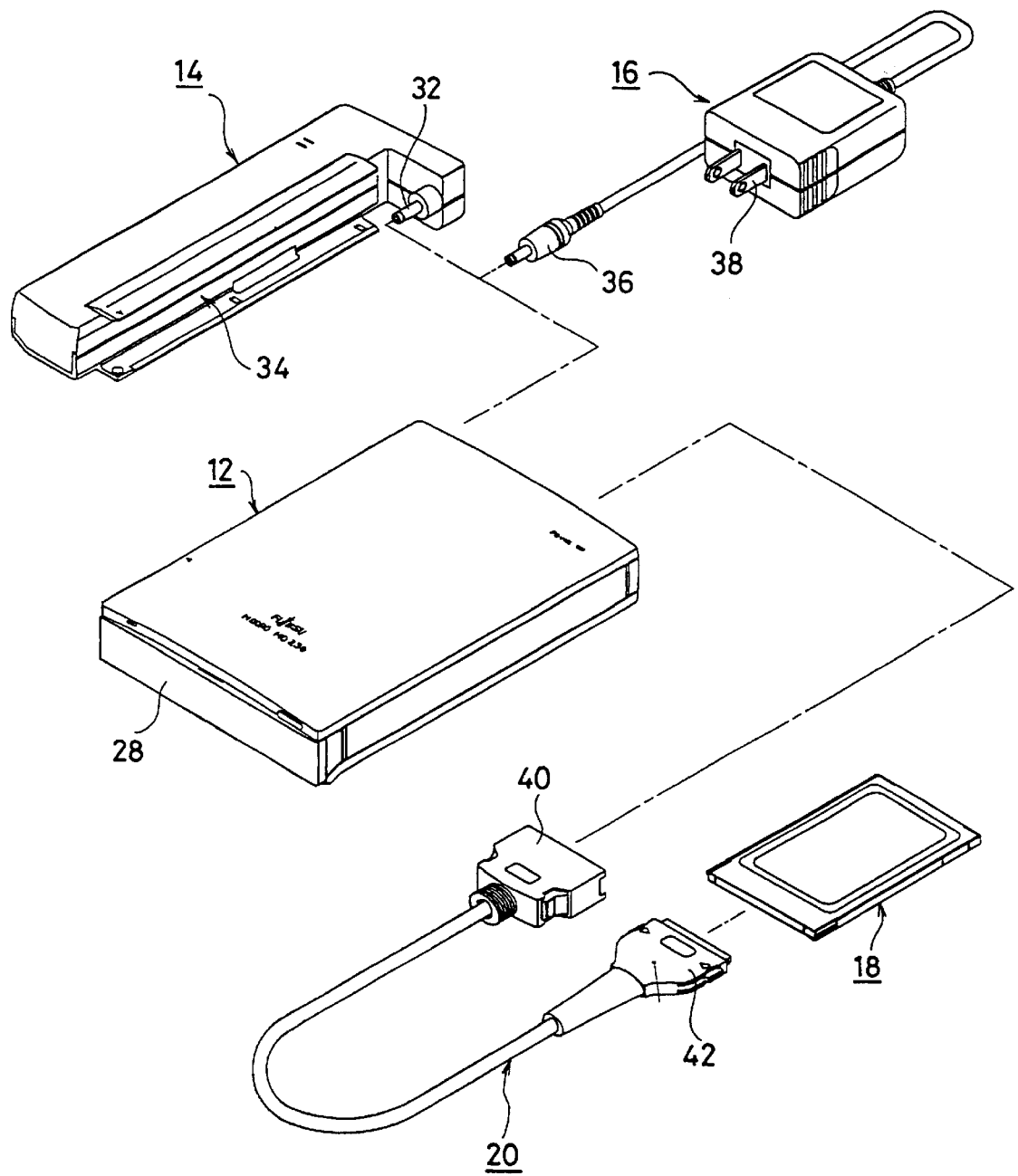
FIG. 2 is an explanatory diagram of a construction of an apparatus main body and accessories in an optical disk drive of the invention.

FIG. 2 is a whole construction including accessories of the optical disk drive 10 of the invention. The optical disk drive 10 is constructed by the drive main body 12, the battery pack 14, an AC adapter 16, a PCMCIA card 18, and the connector cable 20 for a card. The battery pack 14 has therein, for example, four battery cells of the UM3 type and is attached to the side surface of the drive main body 12 by an engaging portion 34. At the same time, a DC plug 32 is inserted into a plug jack in a rear portion of the drive main body 12. The AC adapter 16 integratedly has an AC plug 38 in the adapter main body. A DC plug 36 is further connected to the AC adapter 16 by a cable. When the apparatus is carried and used, it is sufficient to attach the battery pack 14 to the drive main body 12 and to supply a power source. In case of a desk top type, it is sufficient to perform a power supply by using the AC adapter 16. The battery pack 14 and AC adapter 16 function as an external power source unit for the drive main body 12. The PCMCIA card 18 serving as an interface card has therein an interface converting circuit for getting a compatibility between the ATA interface on the drive main body 12 side and the PCMCIA interface on the notebook-sized personal computer 24 side shown in FIG. 1. Therefore, in a state in which a main body plug 40 of the connector cable 20 for a card is connected to a connector in a rear portion of the drive main body 12 and a card plug 42 is connected to a connector of the PCMCIA card 18, the PCMCIA card 18 is connected to the card slot 26 of the notebook-sized personal computer 24 as shown in FIG. 1, thereby using the drive main body 12 as an external storage.

Figure 3:
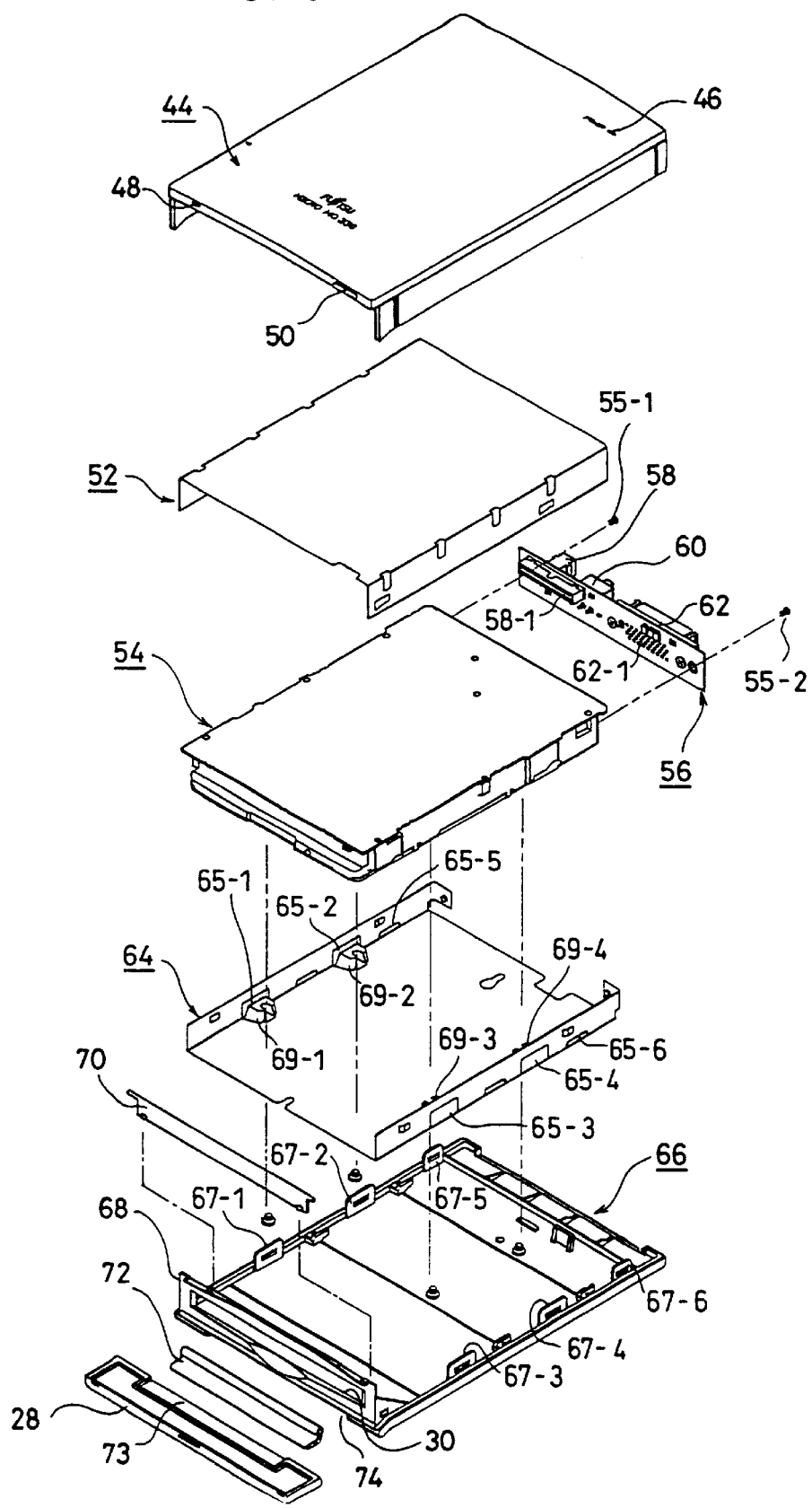
FIG. 3 is an assembly exploded diagram of the apparatus main body of FIG. 2.

FIG. 3 is an assembly exploded diagram of the drive main body 12 in FIG. 2. The drive main body 12 is constructed by a top casing 44, a top plate 52, a drive unit 54, a bottom plate 64, and a bottom casing 66 from the top. The top casing 44 has a window 46 for a power display LED in a rear portion of the top surface. A window 48 for a driving operation LED and an ejection switch 50 are provided in a top end portion of the front surface. By enclosing the drive unit 54 together with the bottom plate 64, the top plate 52 has a sliding function for external noises and a shielding function of radiated noises to the outside. An insertion port of the MO cartridge is opened on the front side of the drive unit 54 and a printed circuit board 56 for relay is attached to a rear portion of the drive unit 54. A jack 58 for a DC plug, a power switch 60, and a connector 62 for a cable are attached to the outside of the printed circuit board 56 for relay.

Figure 4:
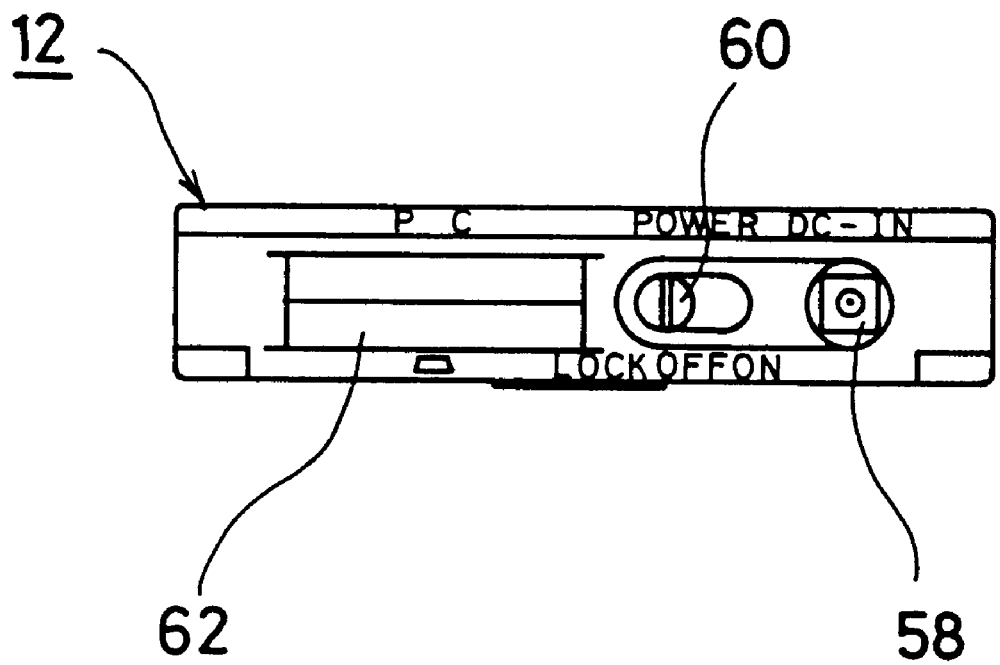
FIG. 4 is an explanatory diagram of a printed circuit board for relay which is positioned in a rear portion of the main body in FIG. 3.

The details of the rear surface side of the printed circuit board 56 for relay are shown in FIG. 4. Namely, the jack 58 for a DC plug and the power switch 60 are provided on the rear surface side which faces the outside of the printed circuit board 56 for relay, thereby enabling a power source to be supplied from either the battery pack 14 or AC adapter 16 in FIG. 2. A connector 62 for a cable is provided, thereby enabling the main body plug 40 of the connector cable 20 for a card in FIG. 2 to be attached.

Referring again to FIG. 3, a connector 58-1 for a power source is provided on the inside of the jack 58 for a DC plug provided for the printed circuit board 56 for relay. A connector 62-1 for interface is provided on the inside of the connector 62 for a cable. In correspondence to each of the connector 58-1 for a power source and the connector 62-1 for interface, connectors are also provided on the drive unit 54 side, so that the printed circuit board 56 for relay can be electrically and mechanically connected to the rear side of the drive unit 54 by a connector connection. A frame 68 is vertically formed upward in the front portion of the bottom plate 64. The medium insertion port 30 is opened in the frame 68. A hinge receiving portion 74 is formed in the lower portion of the frame 68. A hinge 72 having an L-shaped cross sectional shape is rotatably attached to the hinge receiving portion 74. A front portion side of the hinge 72 is rotatably attached to a hinge receiving portion 73 on the lower inner side of the front cover 28. A door panel 70 is arranged on the rear side of the medium insertion port 30 which is opened in the frame 68 so as to be rotatable around both edges of the upper portion as fulcrums. The door panel 70 closes the medium insertion port 30 by its self weight and a force by a coil spring (not shown). When the medium cartridge is inserted from the front side, the door panel 70 is rotated upward, thereby allowing the passage of the medium. Therefore, the insertion of a foreign material from the outside cannot be prevented by only the door panel 70. On the other hand, according to the invention, the front cover 28 serving as a lid member is further provided in the front portion of the medium insertion port 30 by the hinge 72, thereby preventing that the foreign material enters the inside of the apparatus from the medium insertion port 30 when the apparatus is carried. Engaging ribs 67-1 to 67-4 are vertically formed upward on the side surfaces of the bottom casing 66. Receiving portions 65-1 to 65-4 which are opened in the side walls of the bottom plate 64 are fitted to the engaging ribs 67-1 to 67-4 and are sandwiched and fixed between the engaging ribs and fixing members 69-1 to 69-4 which are attached to the inside and are made of plastics. Engaging ribs 67-5 and 67-6 are vertically formed upward on the side surfaces of the bottom casing 66. Receiving portions 65-5 and 65-6 which are opened in the side walls of the bottom plate 64 are inserted to the engaging ribs 67-5 and 67-6, thereby positioning.

Figure 5:
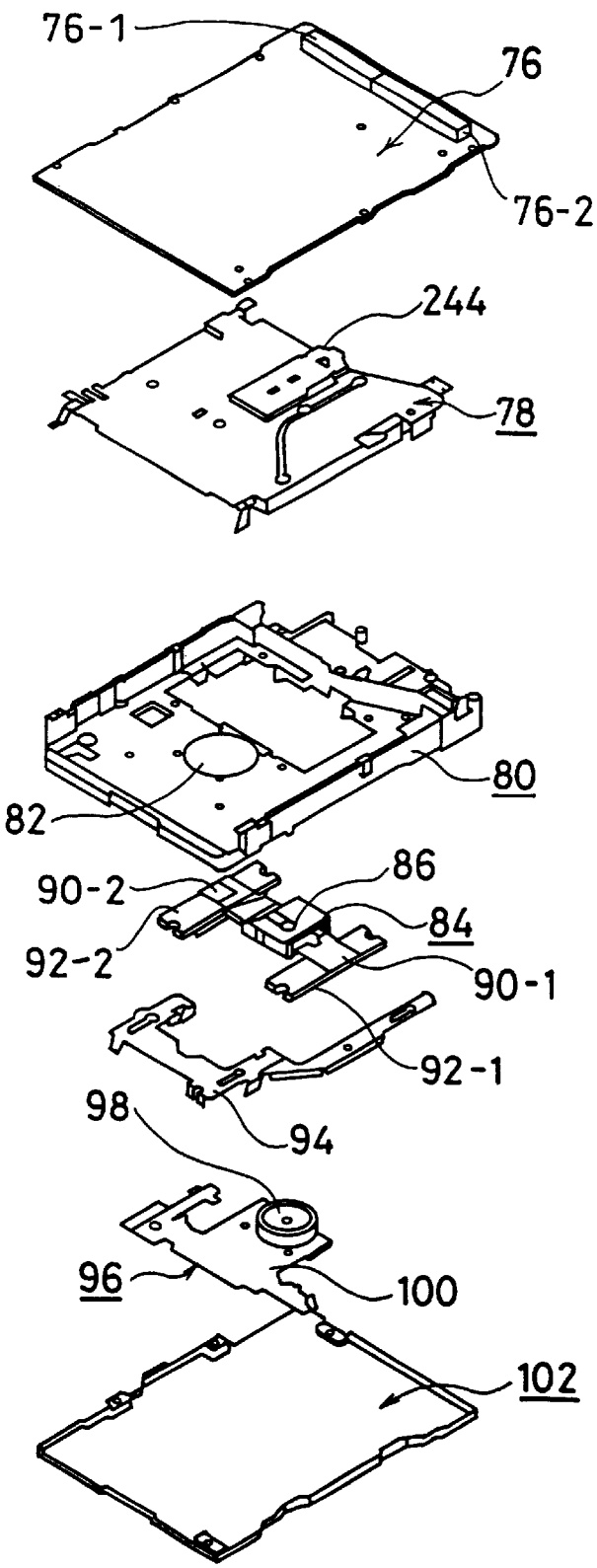
FIG. 5 is an assembly exploded diagram of a drive unit in FIG. 2.

FIG. 5 is an assembly exploded diagram of the drive unit 54 in FIG. 3. The drive unit 54 is constructed by a printed circuit board 76, a cartridge holder 78, a drive base 80, a lens carriage 84, a slide plate 94, a spindle unit 96, and a cover 102 from the top. Among them, the component elements from the drive base 80 to the lower cover 102 are further shown in an assembly exploded diagram of FIG. 6 in a state in which they are seen from the bottom surface.

In FIG. 5, a control circuit which is necessary to control the drive unit 54 is installed on the printed circuit board 76.

A power connector 76-1 and an interface connector 76-2 are attached to the printed circuit board 76. The power connector 58-1 and interface connector 62-2 provided on the inside of the printed circuit board 56 for relay in FIG. 3 are inserted and connected to the power connector 76-1 and interface connector 76-2, respectively. The cartridge holder 78 forms a medium enclosing space between the cartridge holder 78 and the drive base 80 locating in the lower portion, thereby positioning the MO cartridge medium inserted from the front side. An electromagnet 244 is attached. The drive base 80 attaches the lens carriage 84, slide plate 94, and spindle unit 96. The lens carriage 84 constructs a movable optical system. An objective lens 86 is installed on the lens carriage. A laser beam enters the objective lens 86 from a fixed optical unit 108 provided on the bottom portion side of the drive base 80 in FIG. 6. A beam spot is irradiated onto the medium locating upward. A return light is returned to the fixed optical unit 108. Coil portions 90-1 and 90-2 of a VCM are arranged on both sides of the lens carriage 84. The coil portions 90-1 and 90-2 are arranged through gaps in magnetic yoke portions 92-1 and 92-2 which are fixedly arranged. Therefore, by supplying currents to the coil portions 90-1 and 90-2, a linear motor is formed between the magnetic yoke portions 92-1 and 92-2, thereby enabling the lens carriage 84 to be operated in the direction which transverses the tracks on the medium. A lens actuator for moving the objective lens 86 in the direction which transverses the tracks on the medium and a focusing actuator for moving the objective lens 86 in the optical axial direction and executing a focusing control are installed on the lens carriage 84. In association with the insertion of the MO cartridge medium, the slide plate 94 attaches a medium hub to a turntable 98 locating in the lower portion of the spindle unit 96. When ejecting the MO cartridge medium, by the driving of an ejection motor unit 104 in FIG. 6, in FIG. 5, the slide plate 94 is integratedly moved in the depth direction for the drive base 80, the turntable 98 descends downward and is unlocked from the medium. The MO cartridge medium is pressed by a spring provided for the cartridge holder 78, thereby ejecting the medium.

In the spindle unit 96, the turntable 98 is attached on a plate 100 and a spindle motor is assembled in the turntable 98. In the spindle unit 96, by assembling the plate 100 to the lower side of the drive base 80, the turntable 98 is located in an opening 82.

Figure 7:
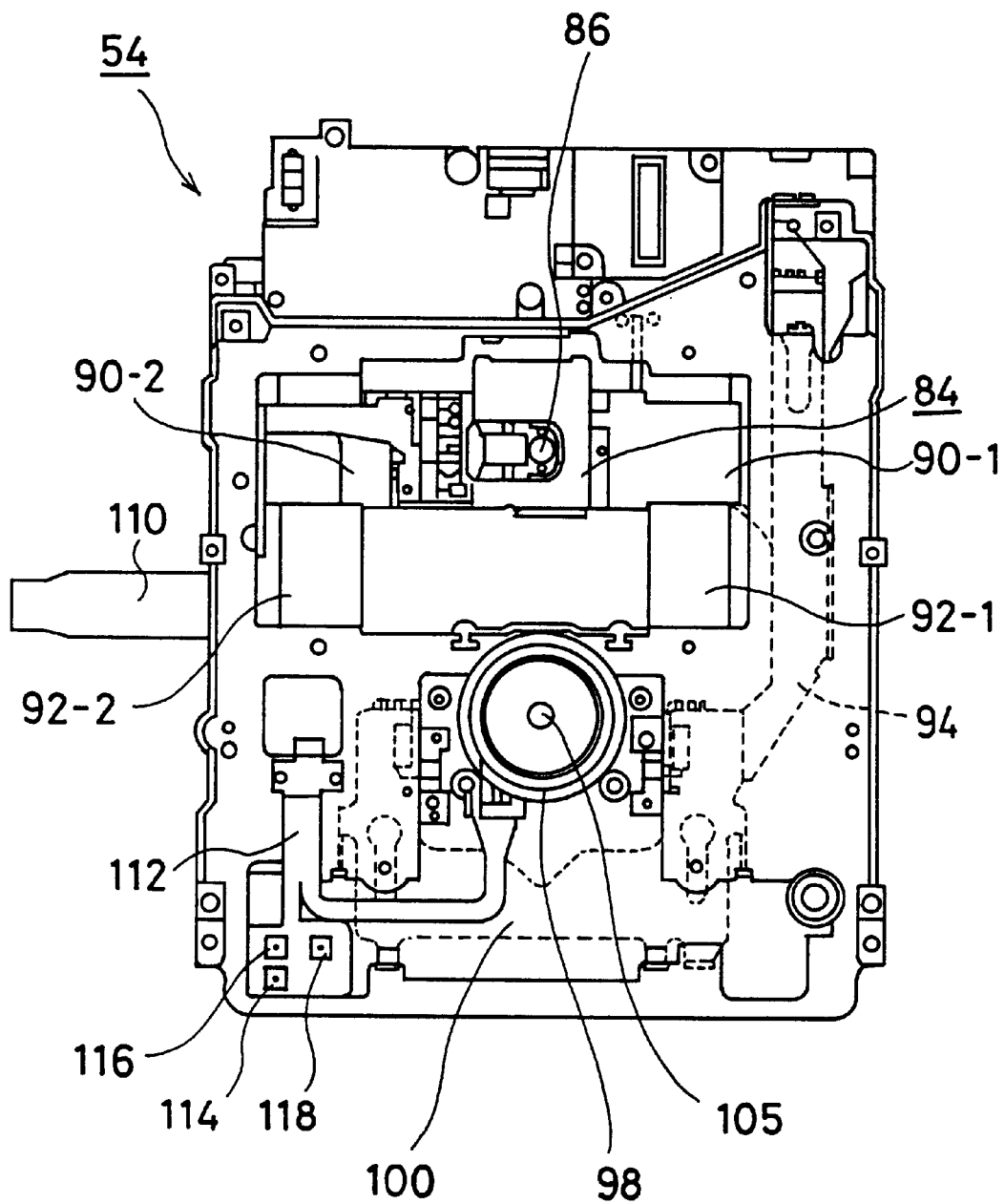
FIG. 7 is a plan view of an assembling state of the drive unit in FIG. 2.

FIG. 7 is a plan view of the drive unit 54 in FIG. 3 in a state in which the printed circuit board 76 and cartridge holder 78 in FIG. 5 are removed. A spindle shaft 105 is provided at the center of the turntable 98 in the spindle unit. The hub of the MO cartridge medium inserted from the medium insertion port serving as a lower side is coupled to the spindle shaft 105. In association with the medium insertion, when the medium hub is located to the spindle shaft 105, it is attracted by a magnet chucking and the hub is coupled to the spindle shaft 105. The objective lens 86 is arranged to the lens carriage 84 upward. By supplying currents to the coil portions 90-1 and 90-2 arranged on both sides of the lens carriage 84, the lens carriage 84 is moved in the vertical direction for the magnetic yoke portions 92-1 and 92-2, namely, in the direction which transverses the tracks on the medium attached to the spindle shaft 105. An FPC (Flexible Printed Circuit) 112 is arranged on the medium inserting side serving as a front side of the turntable 98, thereby electrically connecting with the spindle motor built in the turntable 98. The FPC 112 continues to an FPC 110 taken out to the side surface side, thereby connecting with the printed circuit board side. A write enable sensor 114, a write protection sensor 116, and a cartridge insertion sensor 118 are provided for the FPC 112 arranged on the entrance side. Pin switches or the like are used as three sensors 114, 116, and 118. The write enable sensor 114 detects a write enable position of a switching knob for a write enable and a write protection provided for the M0 cartridge medium. The write protection sensor 116 detects a write protecting position of a switching knob for a write enable and a write protection of the medium. The cartridge insertion sensor 118 detects the insertion of the MO cartridge medium to the drive unit 54, thereby allowing the drive to be activated. Specifically speaking, the turntable 98 is rotated by the spindle motor, thereby starting the operation of the controller.

Figure 6:
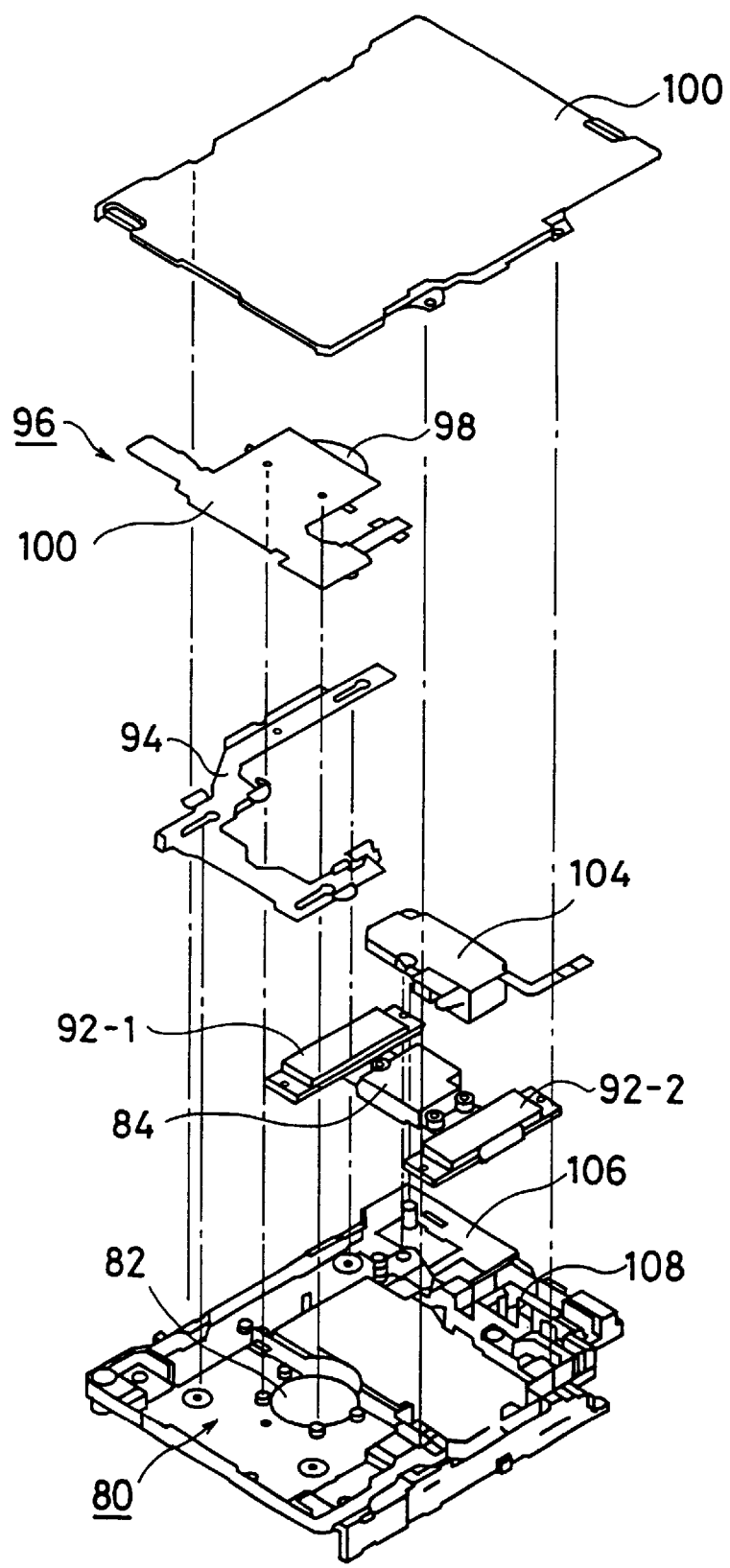
FIG. 6 is an assembly exploded diagram when components from a drive casing to a lower cover in FIG. 5 are seen from the bottom surface.
Figure 8:
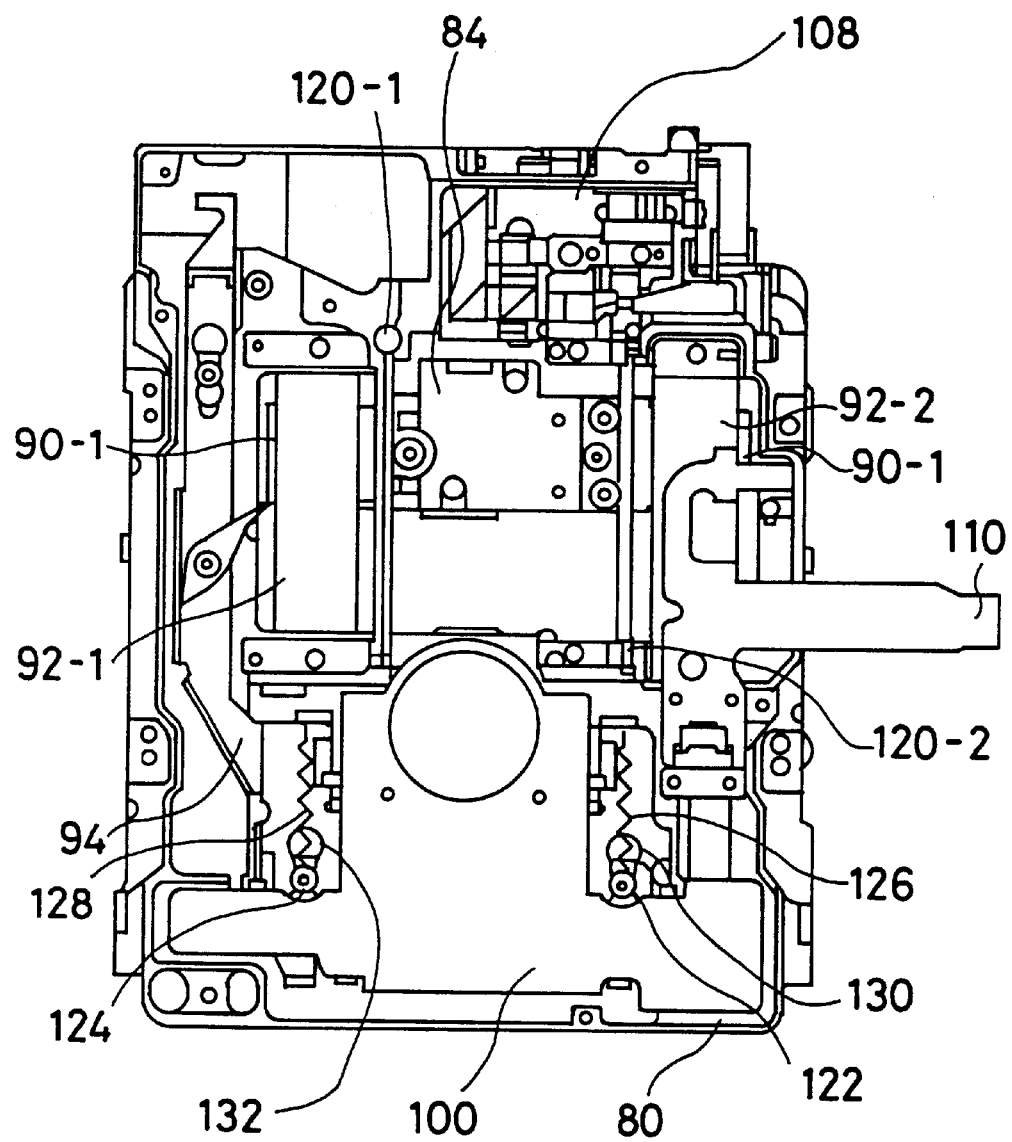
FIG. 8 is a bottom view of the assembling state of the drive unit in FIG. 2.

FIG. 8 is a diagram on the rear surface side of the drive unit 54 in FIG. 7 and shows a state in which the cover 102 in FIG. 6 is removed. The slide plate 94 is attached to pins 122 and 124 fixed to the drive base 80 side so as to be slidable in the medium inserting direction by guide grooves 130 and 132 and is further urged to the medium inserting side by coil springs 126 and 128. The fixed optical unit 108 is provided on the upper side of the diagram which faces the lens carriage 84. A laser diode, a detector for recording and reproduction, a detector for a tracking and focusing control, and further an optical system of them are assembled in the fixed optical unit 108.

Figure 9:
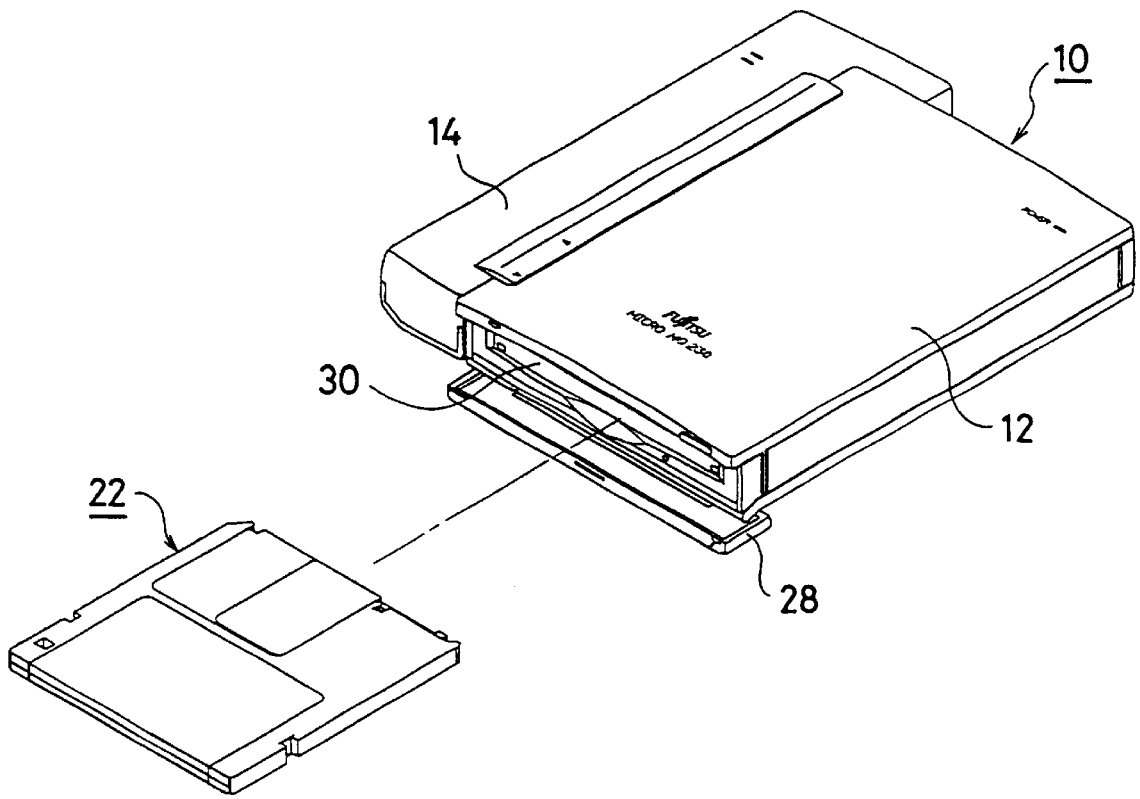
FIG. 9 is an explanatory diagram of a setting state by an opening of a lid member of the apparatus main body of the invention.
Figure 10A:
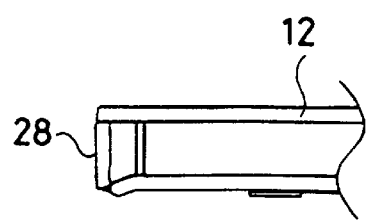
FIGS. 10A and 10B are explanatory diagrams of a supporting function according to the opening of the lid member of the main body in FIG. 9.

FIG. 9 is an explanatory diagram of a setting using state of the optical disk drive 10 of the invention. When the drive main body 12 in the optical disk drive 10 is used, the front cover 28 serving as a lid member provided in the front portion of the drive main body 12 is opened. FIG. 10A is an attaching state of the front cover 28 of the drive main body 12. The front cover 28 is attached as a lid member to the front portion and can prevent the insertion of a foreign material from the medium insertion port 30 during the carrying.

Figure 10B:
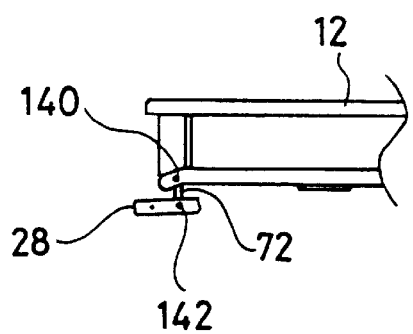

FIG. 10B is a side elevational view in a state in which the front cover 28 in FIG. 9 is opened. As shown in FIG. 3, the front cover 28 is rotatably attached to each of the hinge receiving portion 74 on the bottom casing side and the hinge receiving portion 73 on the front cover 28 side by the L-shaped hinge 72. Therefore, as shown in FIG. 10B, the front cover 28 is supported to the drive main body 12 at two points of fulcrums 140 and 142. Therefore, by opening the front cover 28 and locating on the lower side as shown in FIG. 10B, the front cover 28 functions as a supporting base to lift up the front portion of the drive main body 12 through the hinge 72. Thus, in the state in which the front cover 28 is opened as shown in FIG. 9, the medium insertion port 30 of the drive main body 12 is lifted up in the oblique upward direction. Even if the drive main body 12 is a thin type, the M0 cartridge 22 can be easily attached and detached to/from the medium insertion port 30.

Figure 11:
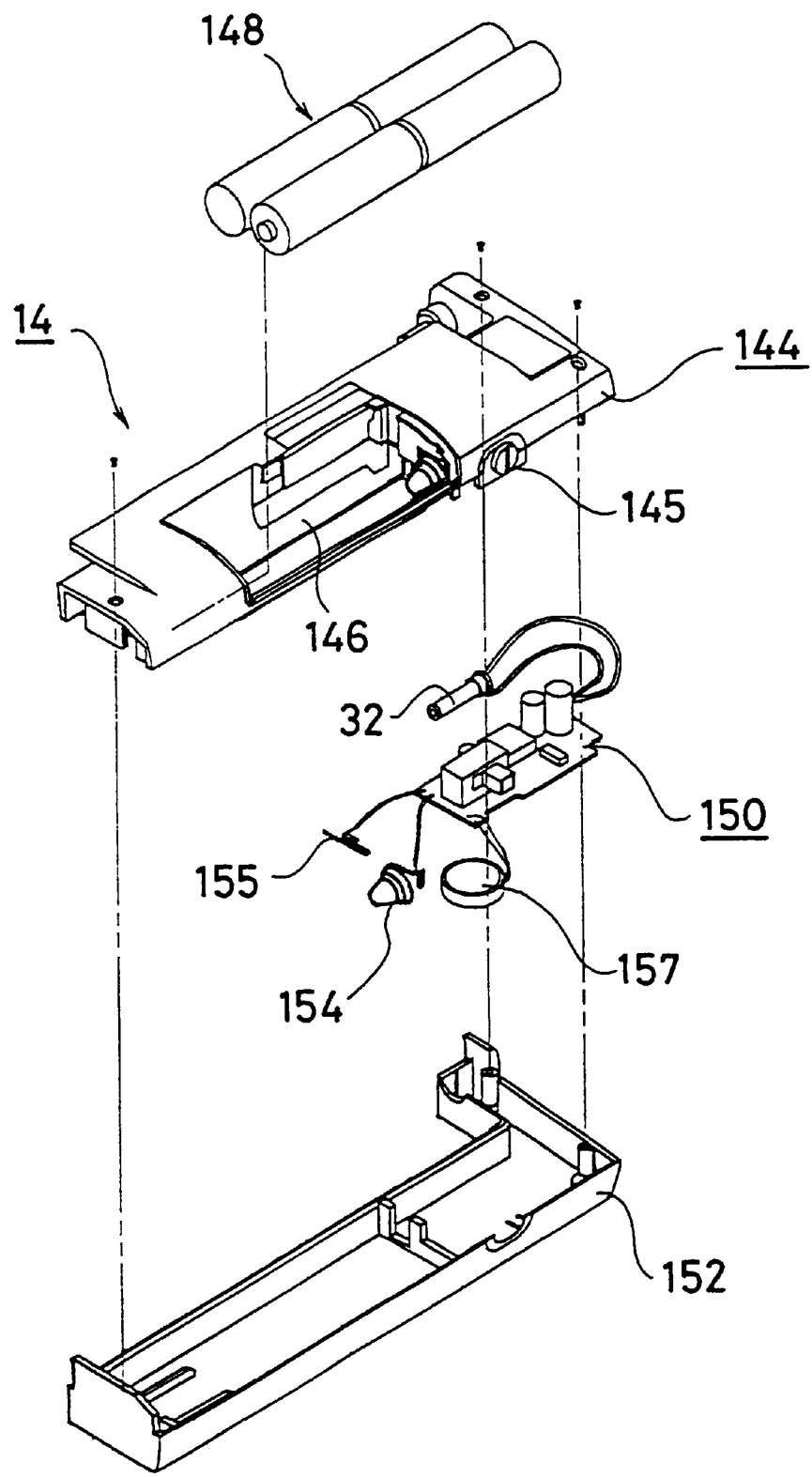
FIG. 11 is an assembly exploded diagram of a battery pack in FIG. 2.

FIG. 11 is an assembly exploded diagram of the battery pack 14 in FIG. 2. The battery pack 14 is constructed by a top casing 144, a printed circuit board 150, and a bottom casing 152. A battery cell enclosing portion 146 is provided for the top casing 144. In the embodiment, four battery cells 148 of the UM3 type can be enclosed in the top casing 144. Circuits such as charging circuit, DC/DC converter, and the like are installed on the printed circuit board 150. Further, the DC plug 32 is connected to the printed circuit board 150 by a signal line. A coil spring electrode 154 for a minus voltage and a plate electrode 155 for a plus voltage which are provided for the battery cell enclosing portion 146 of the top casing 144 are connected by signal lines. Further, a switch knob 145 is provided for the top casing 144. A switch unit 157 which is turned on/off by the switch knob 145 is connected to the top casing 144 by a signal line.

Figure 12:
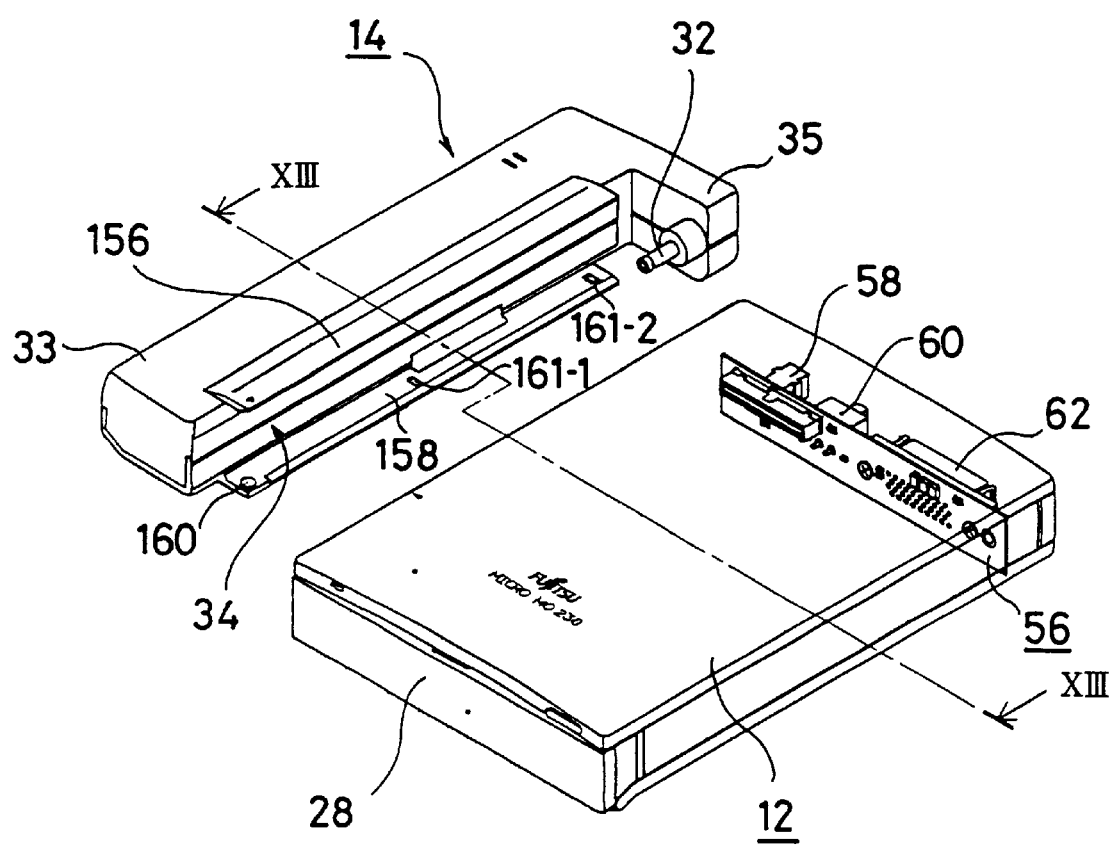
FIG. 12 is an explanatory diagram of an assembly structure of the apparatus main body and the battery pack.

FIG. 12 is a diagram showing an assembly structure of the battery pack 14 in FIG. 11 to the drive main body 12. The battery pack 14 is constructed by: a pack main body 33 locating on the side surface side of the drive main body 12; and a plug supporting portion 35 which is integratedly formed with the pack main body 33 and is extended to the position of the jack 58 for a DC plug on the rear portion side of the drive main body 12. Pressing plates 156 and 158 are protruded and formed in the upper and lower portions of the position which faces the side surface of the drive main body 12 of the pack main body 33. A guide knob 160 is projected in the inside corner portion of the pressing plate 158 locating on the lower side. Further, projections 161-1 and 161-2 are formed in the corner portions on the side opposite to the inside center of the pressing plate 158. With regard to the pressing plate 156 locating on the upper side as well, similar projections are formed at three positions which face the lower guide knob 160 and projections 161-1 and 16-2.

FIG. 13 shows an assembling portion in a state in which the drive main body 12 and battery pack 14 in FIG. 12 are turned over. In correspondence to the guide knob 160 formed on the inside of the pressing plate 158 of the battery pack 14, a guide groove 166 is formed on the back surface side of the drive main body 12. The guide groove 166 forms a leading groove 166-1 which is opened on the side surface side and an engaging guide groove 166-2 which is extended on the front cover 28 side subsequent to the leading groove 166-1. A concave portion serving as a knob engaging portion 168 is formed at a termination end of the engaging guide groove 166-2. Therefore, the guide knob 160 of the battery pack 14 is pushed into the leading groove 166-1 of the guide groove 166 of the drive main body 12 in a position matching state and is slid forward, thereby enabling the guide knob 160 to be engaged into the knob engaging portion 168 at the termination end of the guide groove 166.

FIGS. 14A and 14B are explanatory diagrams of an assembly of the battery pack 14 to the drive main body 12 in a state in which the back surface is set to the upper surface. First as shown in FIG. 14A, the projection members 156 and 158 of the engaging portion 34 of the battery pack 14 are positioned for the side surface of the drive main body 12 and the guide knob 160 is moved along the guide groove 166 as shown in FIG. 13, so that an assembling state of FIG. 14B can be obtained. A side surface projection 164 is formed on the side surface of the drive main body 12. By pressing and widening the battery pack 14 by the side surface projection 164 in the assembling state of the battery pack 14 in FIG. 14B, an assembling rigidity is assured. Projections 162 are formed at three positions on the inside of the pressing plate 156 of the battery pack 14. A sandwiching strength of the drive main body 12 can be assured by the guide knob 160 and projections 161-1 and 161-2 (refer to FIG. 12) on the pressing plate 158 side.

Referring again to FIG. 12, in addition to the assembly of the battery pack 14 to the drive main body 12 by the engaging portion 34 as mentioned above, the DC plug 32 provided on the inside of the plug supporting portion 35 of the battery pack 14 is inserted into the jack 58 for a DC plug of the drive main body 12 when the battery pack 14 is assembled. Therefore, the battery pack 14 is fundamentally supported to the drive main body 12 at three points of the pressing plates 156 and 158 on the upper and lower positions of the side surface and the insertion of the DC plug 32 into the jack in the rear portion. Thus, the battery pack 14 can be assembled to the drive main body 12 with a high enough rigidity. Simultaneously with the mechanical assembly of the battery pack 14 to the drive main body 12, the electrical connection can be performed by inserting and connecting the DC plug 32 into the jack 58 for a DC plug. A power cable between the battery pack 14 and the drive main body 12 is made unnecessary. It is convenient to handle.

Figure 15:
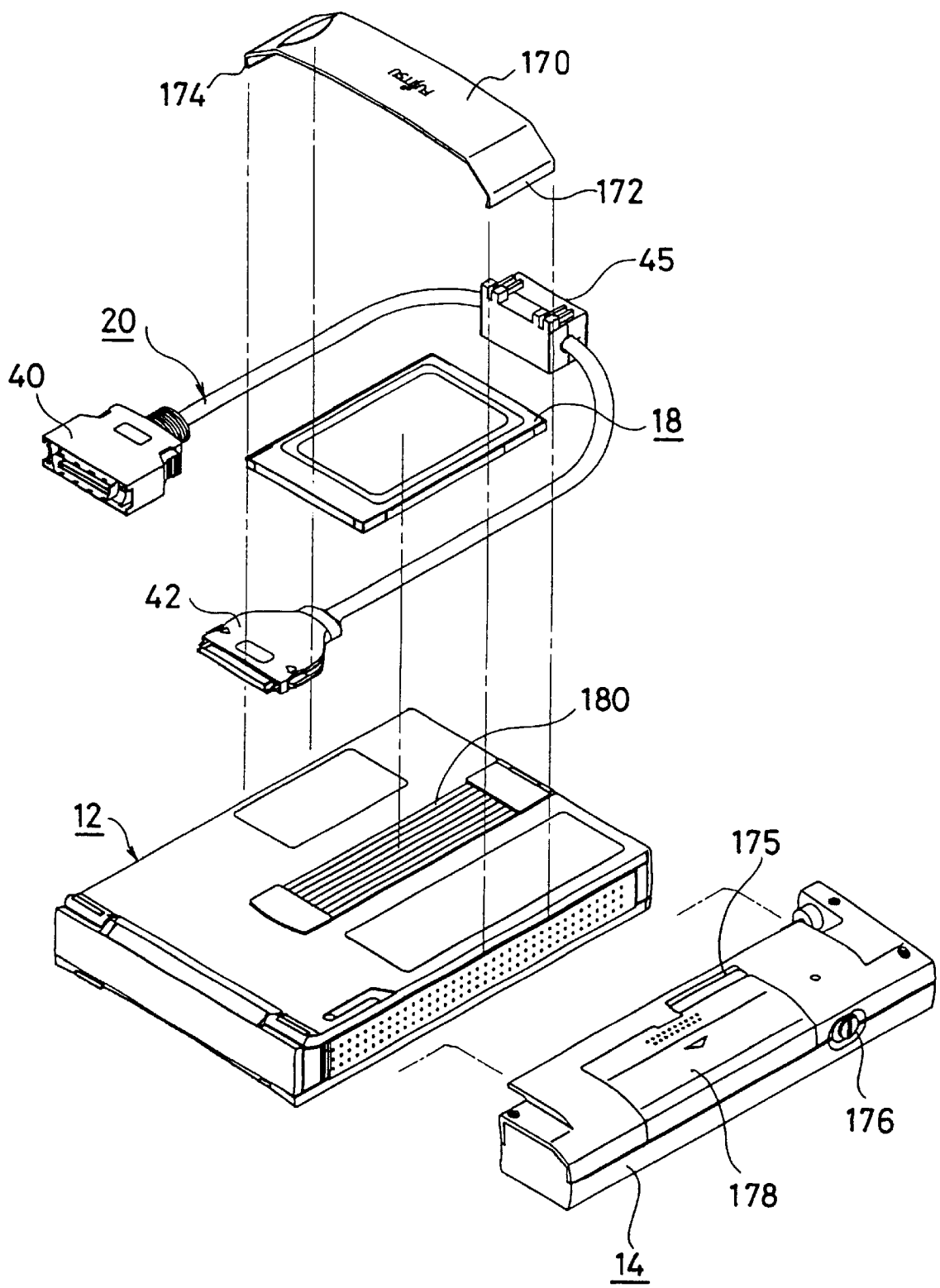
FIG. 15 is an assembly exploded diagram when packaging at the time of the carrying in the invention.

FIG. 15 shows a assembly exploded diagram of a packaging when the optical disk drive of the invention is carried. The optical disk drive of the invention needs the battery pack 14, PCMCIA card 18, and connector cable 20 for a card as accessories for the drive main body 12. When those accessories are separately carried, there is a problem such that the user forgets to bring necessary parts or it is troublesome to take them out. To prevent such a problem, according to the invention, the PCMCIA card 18 and the connector cable 20 for a card are supported and fixed to the bottom surface of the drive main body 12 by a holder 170 and can be packaged. With respect to the battery pack 14, by assembling to the drive main body 12, it can be also similarly packaged when carrying. A card receiving plate 180 is formed on the bottom surface of the drive main body 12 and grooves in the vertical direction are formed on the card receiving plate 180, thereby preventing a slip when the PCMCIA card 18 is put thereon. In the embodiment, as a connector cable 20 for a card, a cable with a filter unit 45 to prevent electromagnetic noises is used. A length of cable to connect the main body plug 40 and card plug 42 is set to a length such that the cable can be curved in a U-shape and put on the upper portion of the drive main body 12. The holder 170 is a plate member curved downward. Engaging nails 172 and 174 are formed in the lower portions on both ends, thereby enabling the holder 170 to be engaged into a frame portion on the bottom portion side of the drive main body 12. Since the attachment of the holder 170 is performed in a state in which the battery pack 14 is assembled to the side surface of the drive main body 12, a rectangular holder attaching hole 175 is opened in the battery pack 14.

Figure 16:
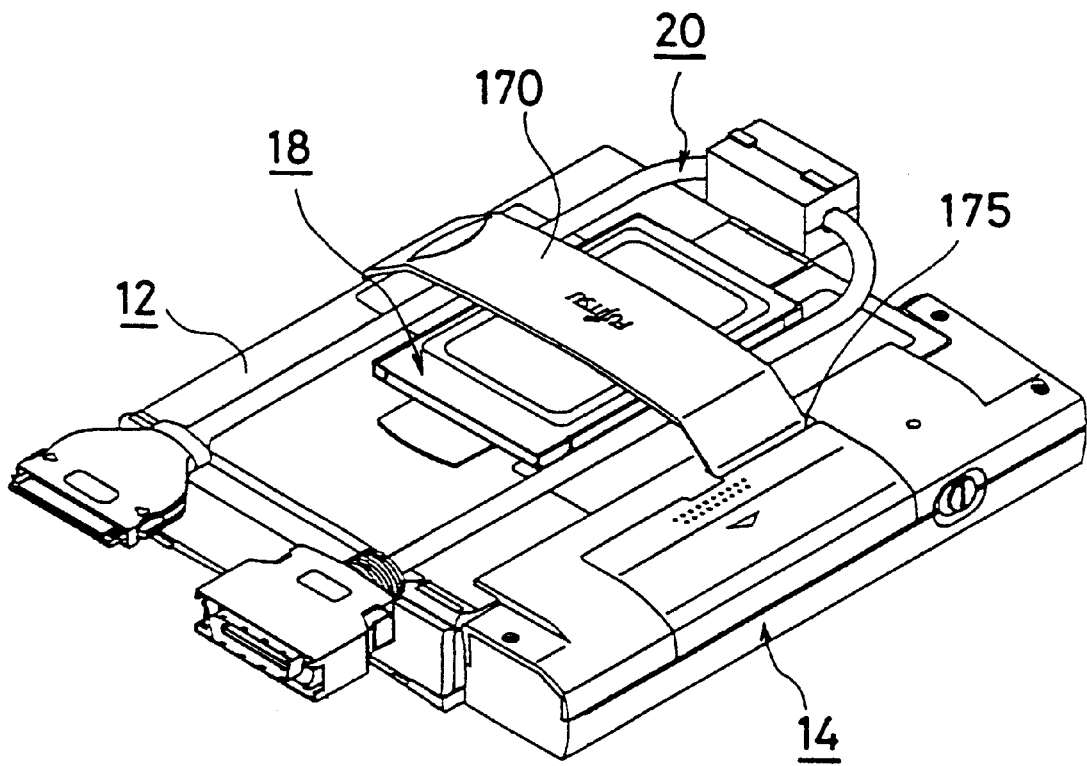
FIG. 16 is an explanatory diagram of a package state using a holder member of the invention.

FIG. 16 shows an assembling state of the battery pack 14, PCMCIA card 18, and connector cable 20 for a card to the drive main body 12 by using the holder 170. The drive main body 12 and its accessories are packaged in a compact size. Therefore, when the optical disk drive of the invention is put in a bag or the like together with the personal computer and is carried, it can be extremely easily enclosed and taken out. A situation such that the user forgets to bring the accessories can be also certainly prevented. Since they are packaged as shown in FIG. 16, a layout of goods when the optical disk drive of the invention is sold or the like can be also fairly easily performed.

Figure 17:
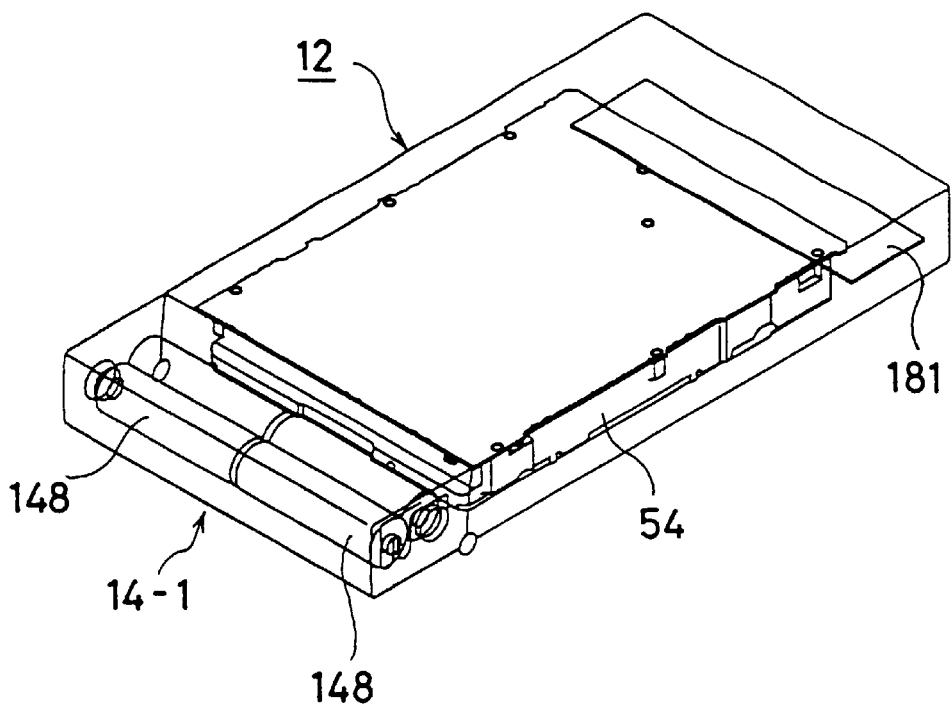
FIG. 17 is an explanatory diagram of an embodiment of the invention in which the battery pack is used as a lid member of the apparatus main body.

FIG. 17 shows another embodiment of an optical disk drive of the invention. The embodiment is characterized in that a battery pack is used as a lid member for the medium insertion port of the drive main body 12. The drive unit 54 is built in the drive main body 12 and a battery pack 14-1 is detachably provided on the medium inserting side serving as a front surface of the drive unit 54. Four battery cells 148 of the UM3 type are merely built in the battery pack 14-1. The printed circuit board 181 for relay to supply a power source between the battery pack 14-1 and the drive unit 54 is installed on the drive main body 12 side.

Figure 18:
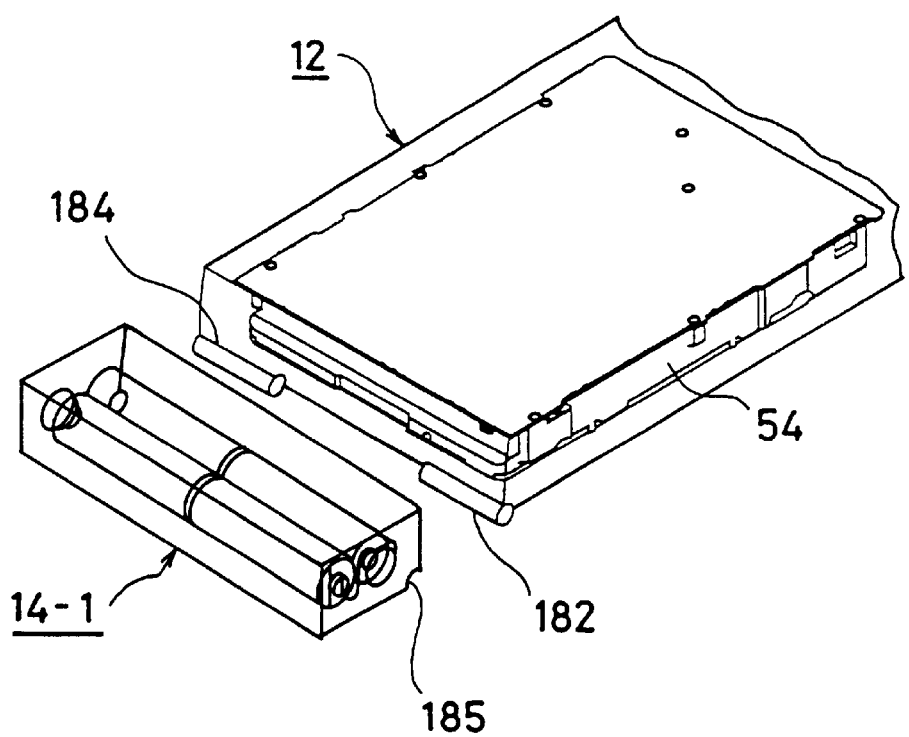
FIG. 18 is an explanatory diagram of a state in which the lid is opened by detaching the battery pack in FIG. 17.

FIG. 18 shows a state in which the battery pack 14-1 in FIG. 17 is removed from the drive main body 12. The battery pack 14-1 is attached to engaging projections 182 and 184 in the front portion on the drive main body 12 side by an engaging concave portion 185. By forming a casing by a resin, the battery pack can be easily attached and detached by a deforming engagement between the engaging concave portion 185 and engaging projections 182 and 184. The battery pack 14-1 removed from the drive main body 12 is made operative by supplying a power source of the battery by connecting the DC plug on the battery pack 14-1 side to the jack provided on the printed circuit board 181 side for relay in the rear portion of the drive main body 12 in FIG. 18.

Figure 19:
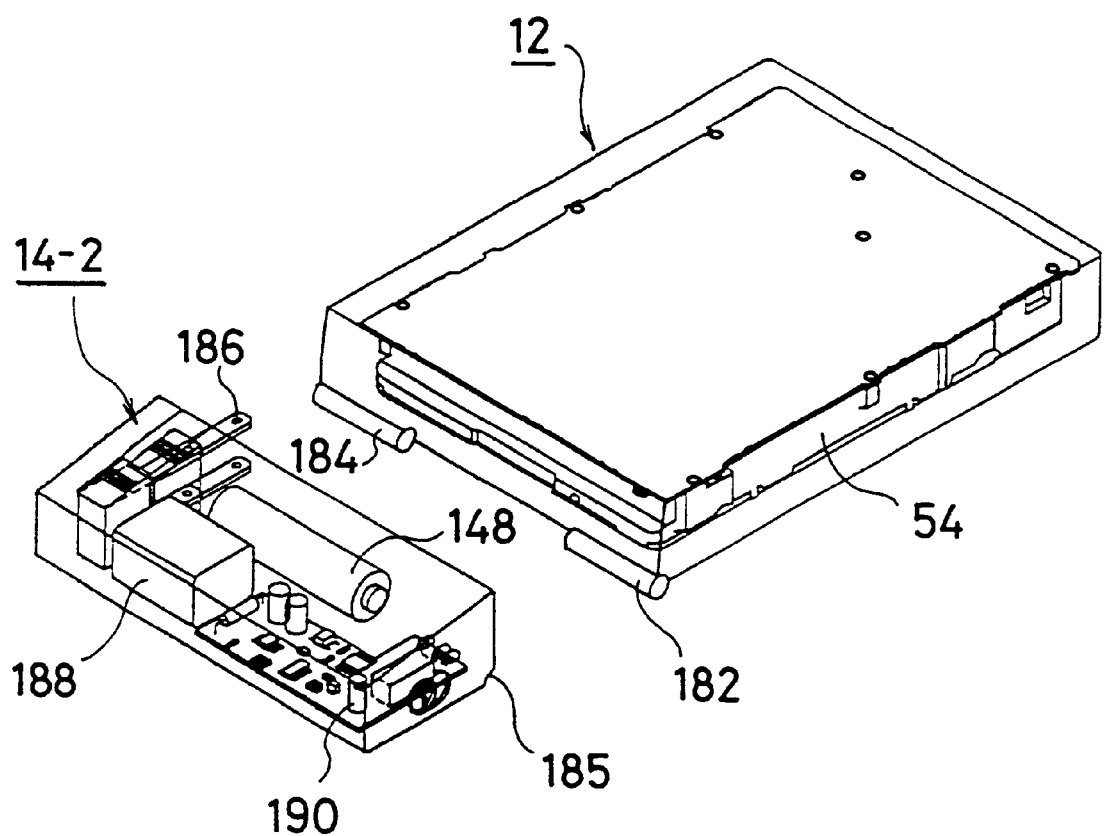
FIG. 19 is an explanatory diagram of another embodiment of the invention in which the battery pack is used as a lid member of the apparatus main body.

FIG. 19 shows another embodiment in which the battery pack is used as a lid member of the medium insertion port of the drive main body. A battery pack 14-2 in the embodiment is characterized in that a printed circuit board 190 on which an AC plug 186, a Ad F charging circuit 188, and circuits such as DC/DC converter and the like are installed and, further, a power switch 192 are provided. The attachment and detachment of the battery pack 14-2 to/from the front portion of the drive main body 12 having the medium insertion port are executed by the engaging concave portion 185 on the battery pack 14-2 side and the engaging projections 182 and 184 on the drive main body 12 side in a manner similar to the embodiment of FIG. 18. It is sufficient that the power supply to the drive main body 12 from the battery pack 14-2 removed from the drive main body 12 is executed by inserting a DC plug (not shown) of the battery pack 14-2 into the jack for a DC plug provided in the rear portion of the drive main body 12. For example, for the drive main body 12, the battery pack 14-2 is provided so as to be rotatable for the engaging projection 182, the FPC is buried into the engaging projection 182, and the DC plug is connected in the inside. When the battery pack 14-2 is detachable for the drive main body 12, the plug cable is pulled out from the battery pack 14-2 and the DC plug is fitted into the jack provided in the rear or front portion of the drive main body 12, thereby connecting. It will be obviously understood that the battery pack 14-2 and drive main body 12 are connected by a power cable and a power source is supplied.

[Interface Card]

Figure 20B:
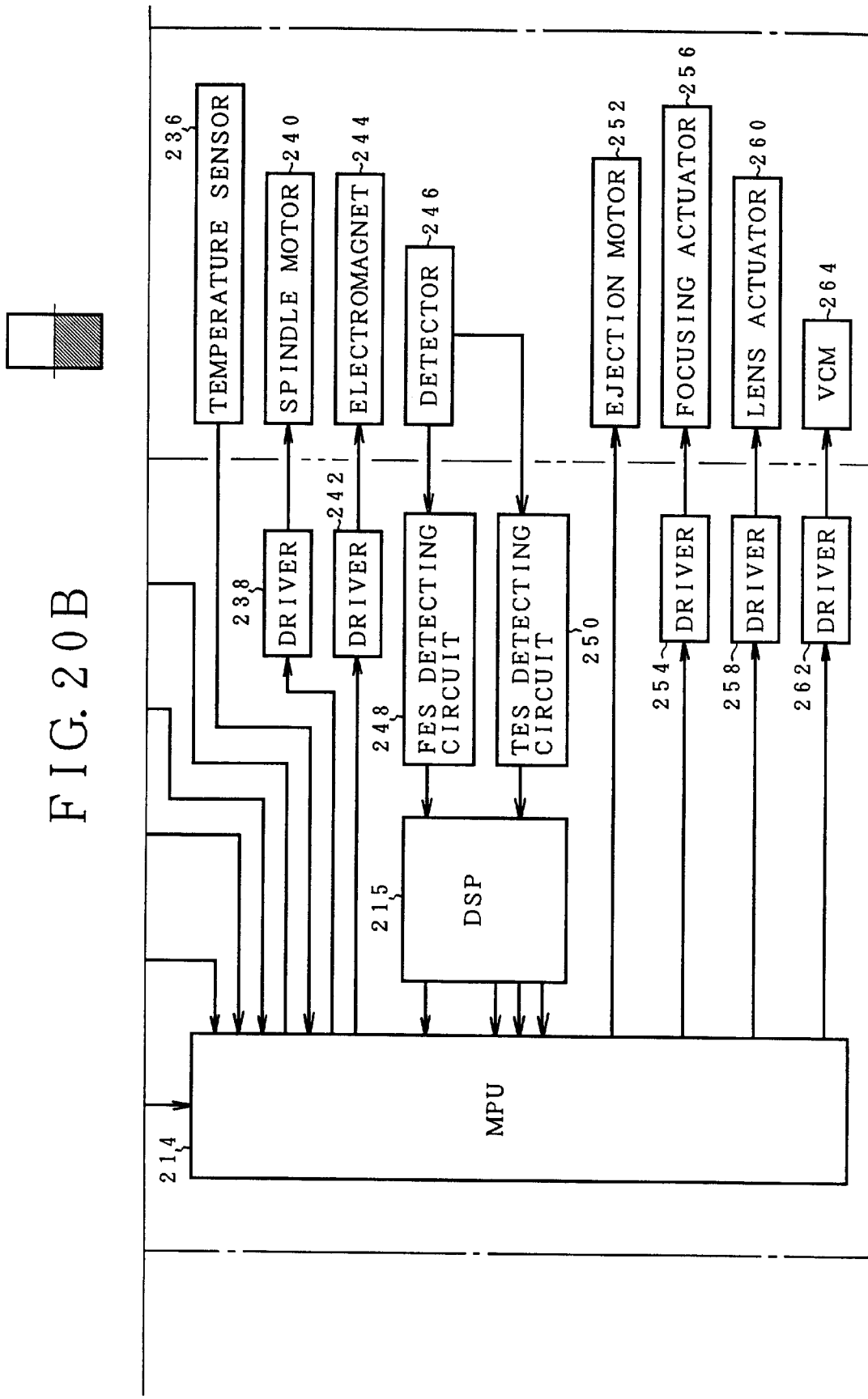

FIGS. 20A and 20B are circuit block diagrams on the side of a controller and an enclosure which are provided for the drive main body 12 in FIG. 1. An optical disk drive of the invention is constructed by a controller 210 and an enclosure 212. The controller 210 has: an MPU 214 for performing a whole control of the optical disk drive; an ATA interface controller 216 for transmitting and receiving commands and data to/from an upper apparatus; a formatter 218 for performing processes which are necessary to write and read data to/from the medium; and a buffer memory 220. In the embodiment, the buffer memory 220 is commonly used by the MPU 214, ATA interface controller 216, and formatter 218. An encoder 222 and a laser diode control circuit 224 are provided as a writing system for the formatter 218. A control output of the laser diode control circuit 224 is supplied to a laser diode unit 230 provided for an optical unit on the enclosure 212 side. The laser diode unit 230 integratedly has a laser diode and a photosensitive device for monitoring. In the embodiment, either a medium of 128 MB or a medium of 230 MB can be used as an MO cartridge medium for performing the recording and reproduction by using the laser diode unit 230. A pit position recording (PPM recording) is executed as a recording system in this case. A recording format of the medium is set to ZCAV (zone constant acceleration system). The medium of 128 MB has one zone. The medium of 230 MB has 10 zones. As a reading system for the formatter 218, a decoder 226 and a reading LSI circuit 228 are provided. A photosensitive signal of a return light of a beam from the laser diode 230 by a detector 232 provided for the enclosure 212 is inputted as an ID signal and an MO signal to the reading LSI circuit 228 through a head amplifier 234. Circuit functions of an AGC circuit, a filter, a sector mark detecting circuit, a synthesizer, a PLL, and the like are provided for the reading LSI circuit 228. A read clock and read data are formed by the inputted ID signal and MO signal and are outputted to the decoder 226. Since the zone CAV is used as a recording system of the medium by the spindle motor 240, a switching control of a clock frequency corresponding to the zone is executed for the built-in synthesizer from the MPU 214 to the reading LSI circuit 228. A detection signal of a temperature sensor 236 provided on the enclosure 212 side is supplied to the MPU 214. On the basis of a temperature in the apparatus detected by the temperature sensor 236, the MPU 214 controls each of reading, writing, and erasing light emitting powers in the laser diode control circuit 224 to an optimum value. The MPU 214 controls a spindle motor 240 provided for the enclosure 212 by a driver 238. Since the zone CAV is used as a recording format of the MO cartridge medium, the spindle motor 240 is rotated at a constant speed of, for example, 2700 rpm. The MPU 214 also controls the electromagnet 244 provided on the enclosure 212 side through a driver 242. The electromagnet 244 is arranged on the side opposite to the beam irradiating side of the MO cartridge medium loaded and applies an external magnetic field to the medium upon recording and erasing. A DSP 215 constructs a servo system of a tracking control and a focusing control of an objective lens installed on the lens carriage. Therefore, a 2-split detector 246 for receiving the beam return light from the medium is provided for the optical unit on the enclosure 212 side. An FES detecting circuit (focusing error signal detecting circuit) 248 forms a focusing error signal from the photosensitive output of the 2-split detector 246 and supplies to the DSP 215. A TES detecting circuit (tracking error signal detecting circuit) 250 forms a tracking error signal from the photosensitive output of the 2-split detector 246 and supplies to the DSP 215. The DSP 215 executes various arithmetic operations for the focusing servo and tracking servo and supplies arithmetic operation results to the MPU 214. On the basis of the arithmetic operation results of the DSP 215, the MPU 214 drives a focusing actuator 256 through a driver 254, drives a lens actuator 260 through a driver 258, and further drives a VCM 264 of a lens carriage through a driver 262. Further, the MPU 214 can also drive an ejection motor 252 in accordance with an ejection switch.

In the optical disk drive in FIGS. 20A and 20B, a lens position sensor to detect a position of the lens actuator on the lens carriage, a position detecting device (PSD) to detect a moving position of the lens carriage, and the like are not used on the enclosure 212 side. In the optical disk drive which doesn't have the sensor for detecting the position of the lens carriage and the sensor for detecting the position of the lens actuator, when the lens is sought by the VCM 264, an acceleration similar to that of the lens carriage is applied to the lens actuator 260, thereby preventing the occurrence of a relative displacement of the lens actuator in association with the movement of the lens carriage. The lens carriage is slowly moved so as not to cause an oscillation of the lens actuator upon activation of the lens carriage. By the above method, when a seeking control by the driving of the VCM 264 is performed, the objective lens of the lens actuator can be always fixed and held to the neutral position. Specifically speaking, the DSP 215 controls the VCM 264 by an acceleration activation control system so as to minimize a structural vibration in a manner such that when the lens carriage is moved by the VCM 264, a sudden acceleration/ deceleration pulse is not applied to the VCM as possible. An ideal model is presumed as a target orbit of the acceleration activation control in this case and polynomials of the acceleration, speed, and movement distance showing a target driving profile are formed. For example, it is sufficient that at the time of the seeking operation of the carriage, a target acceleration and a target speed are calculated on the basis of the position of the carriage and the movement distance in the seeking operation of the carriage, and a seeking current is supplied to the VCM 264 on the basis of the calculation results.

FIG. 21 is a circuit block diagram of a using state in which the optical disk drive (drive main body) of FIGS. 20A and 20B is connected to the notebook-sized personal computer 24 as a host by using the PCMCIA card 18. As shown in the controller 210 of FIGS. 20A and 20B, the optical disk drive 10 uses the ATA interface controller. On the other hand, the notebook-sized personal computer 24 using the optical disk drive of the invention as an external storage uses, for example, the PCMCIA interface. Therefore, in order to connect the optical disk drive 10 of the invention as an external storage of the notebook-sized personal computer 24, an interface converting circuit for converting between the ATA interface and the PCMCIA interface is needed. The interface converting circuit is provided by the PCMCIA card 18. On the other hand, the power supply to the optical disk drive 10 is executed by the battery pack 14 or AC adapter 16. The battery pack 14 or AC adapter 16 construct an external power source unit 276. In FIG. 21, an external power source is supplied to the optical disk drive 10 from the battery pack 14 by a power source line 270. On the other hand, the notebook-sized personal computer 24 itself has a power source. When the optical disk drive 10 is connected to the card slot 26 through the PCMCIA card 18, the optical disk drive 10 is also connected to the notebook-sized personal computer 24 by a power source line 272 and an ATA interface signal line 274. As mentioned above, the device side and the host side respectively independently have the power sources. In the case where a conversion connection between the ATA interface on the device side and the PCMCIA interface on the host side is executed by the PCMCIA card, there is a problem such that when the power supply of either the device side or the host side is made valid, an unnecessary current flow through the interface signal line occurs on the power source stop side. To prevent the unnecessary current flow at the time of the one-side power source due to the conversion connection between the ATA interface and the PCMCIA interface, according to the invention, an embodiment of FIG. 22 is provided.

Figure 22:
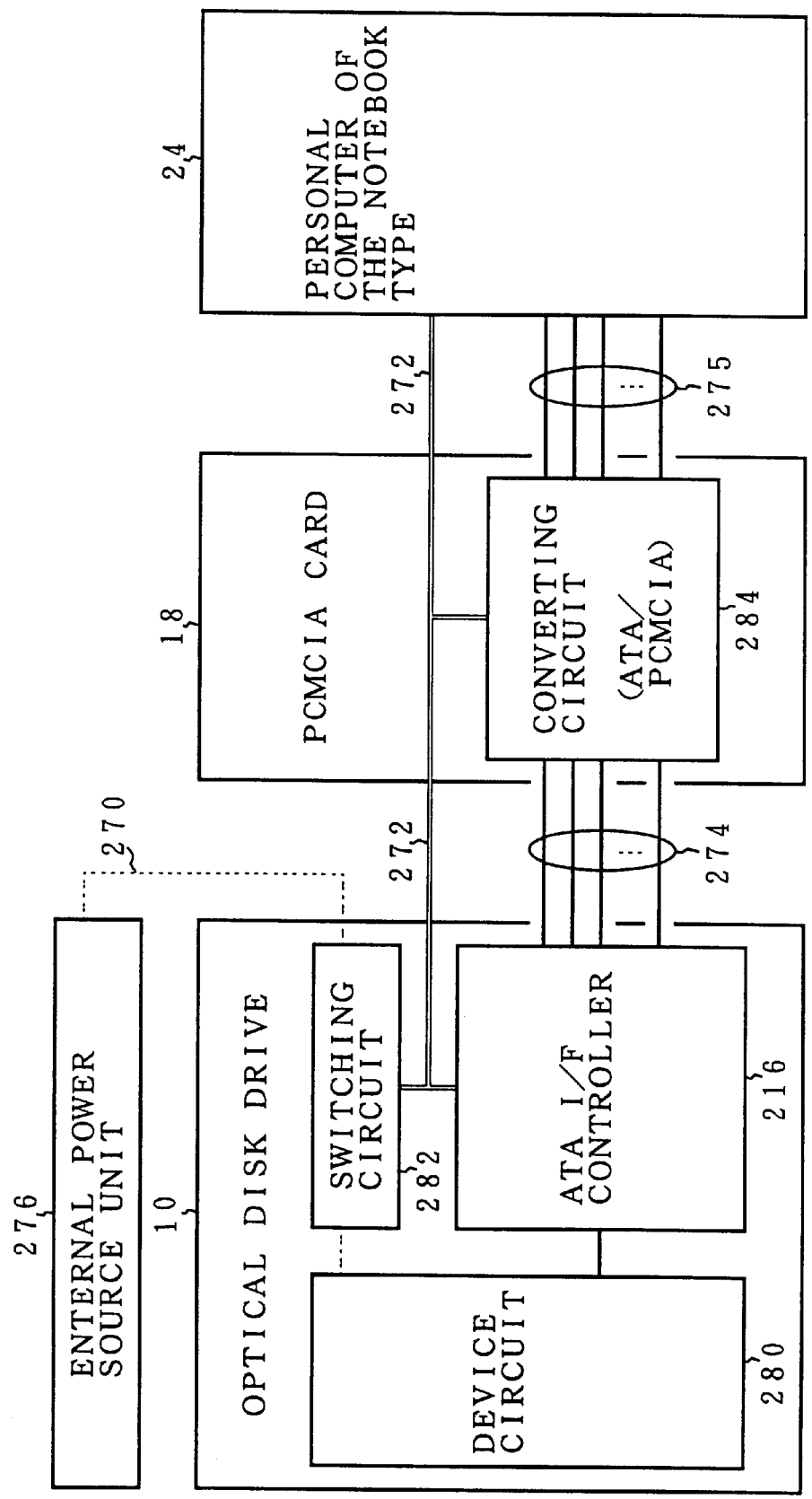
FIG. 22 is a circuit block diagram of an embodiment of the invention for preventing a current flow when a power source is supplied to one of a device and a host.

In FIG. 22, the optical disk drive 10 is connected to the notebook-sized personal computer 24 through the PCMCIA card 18. A converting circuit 284 is built in the PCMCIA card 18 and executes a conversion between the ATA interface on the device side and the PCMCIA interface on the host side. Therefore, the converting circuit 284 is connected to the notebook-sized personal computer 24 by a PCMCIA interface signal line 275. On the other hand, the converting circuit 284 is connected to the optical disk drive 10 side by the ATA interface signal line 274. The ATA interface signal line 274 is connected to the ATA interface controller 216 of the optical disk drive 10. In the optical disk drive 10, circuit sections other than the ATA interface controller 216 are combined as a device circuit unit 280. In the embodiment, a power source is supplied to the ATA interface controller 216 in the optical disk drive 10 via the PCMCIA card 18 by the power source line 272 from the notebook-sized personal computer 24. On the other hand, a power source is supplied to the device circuit unit 280 via the power source line 270 from the external power source unit 276 on the optical disk drive 10 side through a switching circuit 282. The converting circuit 284 provided for the PCMCIA card 18 operates by the power supply from the notebook-sized personal computer 24 via the power source line 272. When the switching circuit 282 provided for the optical disk drive 10 receives both of the power supply from the notebook-sized personal computer 24 by the power source line 272 and the power supply from the external power source unit 276 by the power source line 270, the switching circuit turns on a built-in switch, thereby allowing the power source to be supplied from the external power source unit 276 to the device circuit unit 280. On the other hand, with respect to the case of the power supply from only the notebook-sized personal computer 24 or the power supply from only the external power source unit 276 on the device side, the switching circuit 282 is in the OFF state, thereby shutting off the power supply from the external power source unit 276 to the device circuit unit 280.

Figure 23:
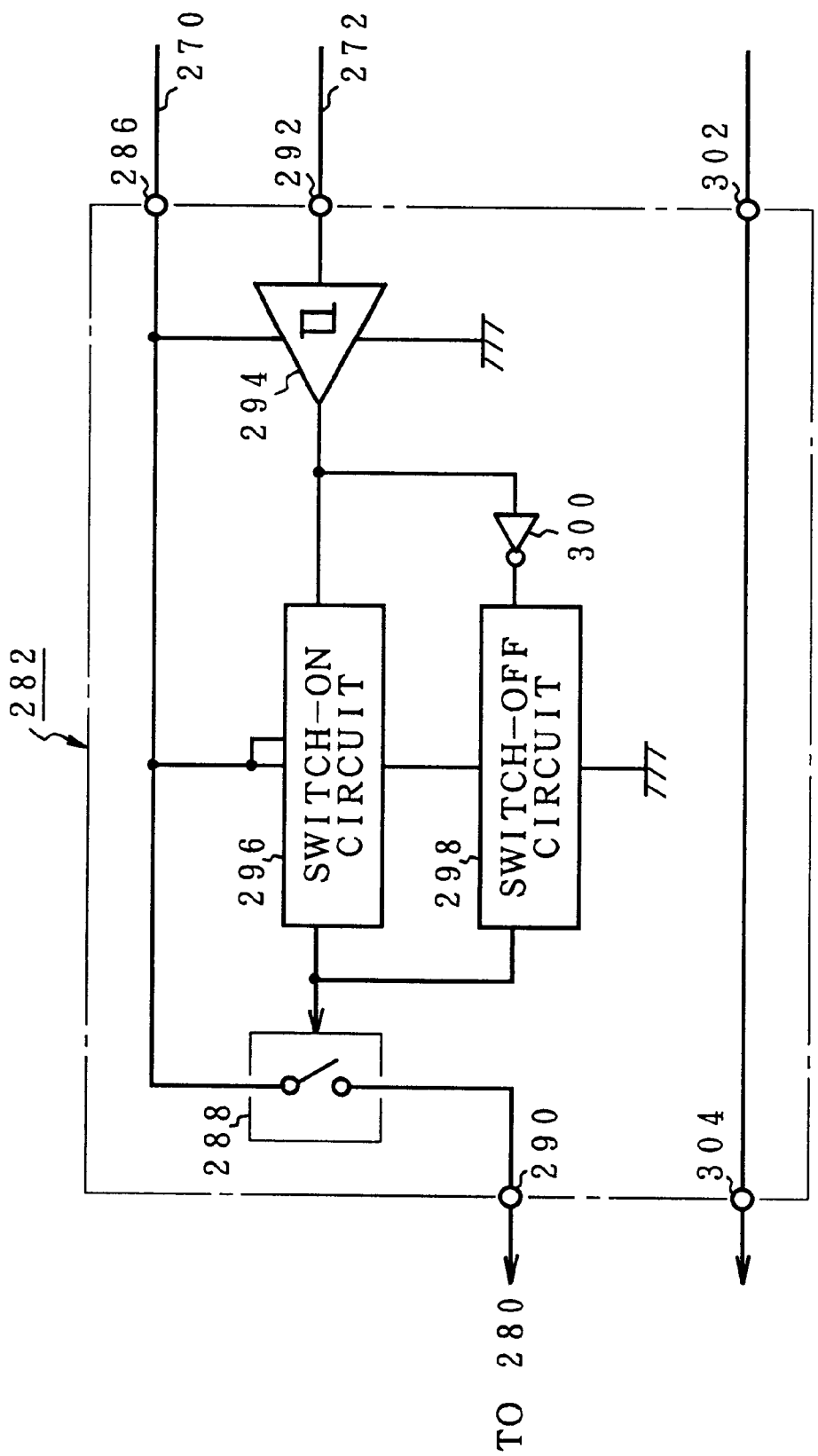
FIG. 23 is a circuit block diagram of a switching circuit in FIG. 22.

FIG. 23 is a circuit block diagram of the switching circuit 282 provided for the optical disk drive 10 in FIG. 22. The switching circuit 282 connects the signal line 270 from the external power source unit 276 on the device side to a power input terminal 286 on the device side and connects the signal line 270 to an internal analog switch 288. An output of the analog switch 288 is connected to the device circuit unit 280 of the optical disk drive by a power output terminal 290. On the other hand, the power source line 272 from the notebook-sized personal computer 24 via the PCMCIA card 18 is connected to a host power input terminal 292 of the switching circuit 282. The host side power input terminal 292 is connected to an input of a comparator 294 provided in the switching circuit 282. The comparator 294 detects the host side power supply voltage by the power source line 272 and causes an H level output. The comparator 294 has hysteresis characteristics in order to prevent an erroneous detection by a fluctuation in power source. An output of the comparator 294 is connected to a switch-on circuit 296 and is connected to a switch-off circuit 298 through an inverter 300. When the host side power supply voltage is derived by the power source line 272, the output of the comparator 294 rises to the H level and the switch-on circuit 296 is made operative, thereby turning on the analog switch 288. For example, an FET is used as an analog switch 288. In this instance, since the output to the switch-off circuit 298 is at the L level due to the inversion of the inverter 300, the switch-off circuit 298 is in the inoperative state. When the host side power supply voltage by the power source line 272 is shut off, the output of the comparator 294 is set to the L level, the switch-on circuit 296 is set into the operative state, and the switch-off circuit 298 is set into the operative state due to the inversion to the H level by the inverter 300, thereby setting the analog switch 288 into a cut-off state. On the other hand, since the analog switch 288, comparator 294, switch-on circuit 296, switch-off circuit 298, and inverter 300 are operating by the power source on the device side, when the power supply on the device side is shut off by the power source line 270, even if the power source is supplied from the host side by the power source line 272, the analog switch 288 is in the cut-off state.

The operation in the power supplying state in FIG. 22 will now be described. First, when the optical disk drive 10 of the invention is normally used as an external storage of the notebook-sized personal computer 24, the power source of the notebook-sized personal computer 24 is turned on and, at the same time, the power source from the external power source unit 276 to the optical disk drive 10 is also turned on. In this case, the switching circuit 282 receives the power supply from the external power source unit 276 on the device side by the power source line 270. At the same time, the switching circuit 282 receives the power supply from the notebook-sized personal computer 24 by the power source line 272 via the PCMCIA card 18. Therefore, the switch-on circuit 296 is made operative by the H level output of the comparator 294 in FIG. 23 and the analog switch 288 is closed, so that the power source is supplied to the device circuit unit 280 and the device circuit unit 296 normally operates. On the other hand, it is now assumed that the external power source unit 276 on the device side is turned off and only the power source of the notebook-sized personal computer 24 is turned on. In this case, the power supply from the notebook-sized personal computer 24 is executed to only the ATA interface controller 216 of the optical disk drive by the power source line 272 and the ATA interface controller 216 operates. In this instance, the switching circuit 282 is in the OFF state because there is no power supply from the device side external power source unit 276 and the device circuit unit 280 is also in the OFF state. Since the ATA interface controller 216 of the optical disk drive 10 can operate by the power supply from the host side as mentioned above, the PCMCIA interface on the host side via the PCMCIA card 18 and the ATA interface on the device side, namely, the ATA interface controller 216 enters the normal operating state. Since both of the interface circuits on the host side and the device side are normal, an unnecessary current flow that is independent on the interface operation doesn't occur. It is now assumed that only the external power source unit 276 on the device side is turned on. In this case, since the power supply from the host side to the ATA interface controller 216 of the optical disk drive is not performed, the ATA interface controller 216 is in the stop state. Since the power supply from the host side is not performed to the switching circuit 282 as well, the switching circuit is also OFF and the device circuit unit 280 is set into the stop state. Therefore, both of the interfaces on the device side and the host side are also in the stop state. Even if the power supply is performed to only the device side, a situation such that the unnecessary current flows to the host side serving as a stop side through the interface signal line can be prevented.

Figure 24:
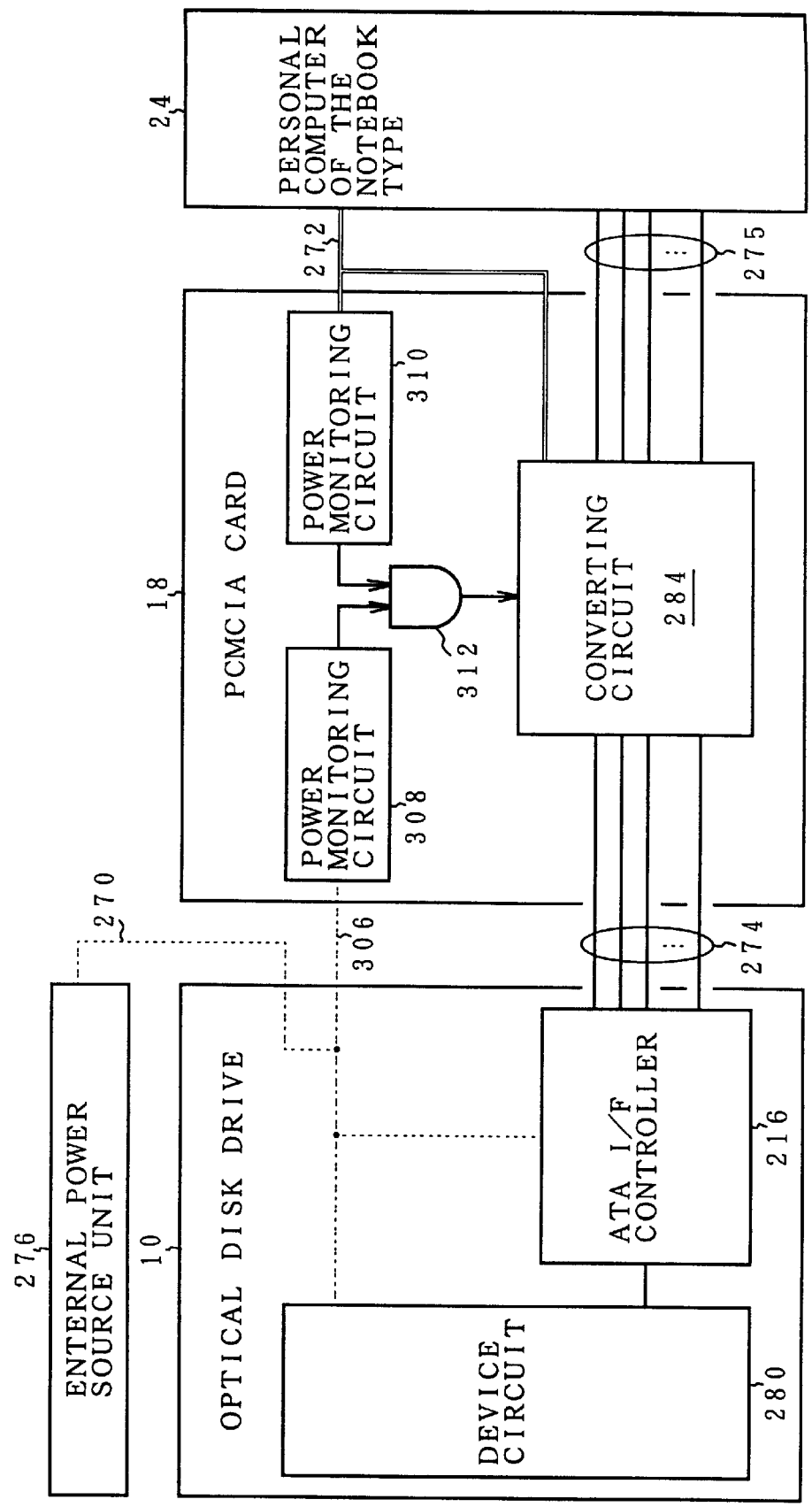
FIG. 24 is a circuit block diagram of another embodiment of the invention for preventing a current flow when a power source is supplied to one of the device and the host.

FIG. 24 is a circuit block diagram of another embodiment for preventing the unnecessary current flow when the power source is supplied to either the host side or the device side. In the embodiment of FIG. 24, power monitoring circuits 308 and 310 to monitor the power supply from each of the device side and the host side are provided for the PCMCIA card 18. When both of the power supplies from the device side and the host side are made valid, it is discriminated by an AND circuit 312, thereby setting the converting circuit 284 into an enable state. As power monitoring circuits 308 and 310, the comparator 294 having the hysteresis characteristics as shown in the switching circuit 282 in FIG. 23 can be used, respectively. The power source line 270 from the external power source unit 276 to the optical disk drive 10 is branched in the drive and connected as a power source line 306 to the power monitoring circuit 308 of the PCMCIA card 18. The power source line 272 from the notebook-sized personal computer 24 is connected to the power monitoring circuit 310 of the PCMCIA card. In the embodiment, the converting circuit 284 receives the power supply by the power source line 272 on the host side and operates. The converting circuit 284 can be also made operative by the power supply from the power source line 306 on the device side. The AND circuit 312 causes an H level output by the AND of two H level outputs when both of the monitoring circuits 308 and 310 receive the power supply, thereby setting the converting circuit 284 into an enable state. Ordinarily, since a converting LSI for realizing a compatibility between the ATA interface and the PCMCIA interface is used as a converting circuit 284, it is sufficient to connect an output of the AND circuit 312 to an enable terminal.

The operation of FIG. 25 will now be described. In a state in which the power supply is normally performed to the optical disk drive 10 from the external power source unit 276 on the device side and, at the same time, the power supply is normally performed by the notebook-sized personal computer 24 via the power source line 272, both of the power monitoring circuits 308 and 310 provided for the PCMCIA card 18 cause the H level outputs. Thus, the output of the AND circuit 312 is also set to the H level, the converting circuit 284 is set into the enable state, and the conversion between the ATA interface on the device side and the PCMCIA interface on the host side can be effectively executed. On the other hand, when the power supply on either the device side or the host side is shut off, the output of either one of the power monitoring circuits 308 and 310 on the shut-off side is set to the L level, the output of the AND circuit 312 is also set to the L level, and the converting circuit 284 is set into a disable state. The ATA interface signal line 274 and PCMCIA interface signal line 275 are disconnected. The unnecessary current flow from the power supplying side to the power stopping side can be prevented.

Figure 25:
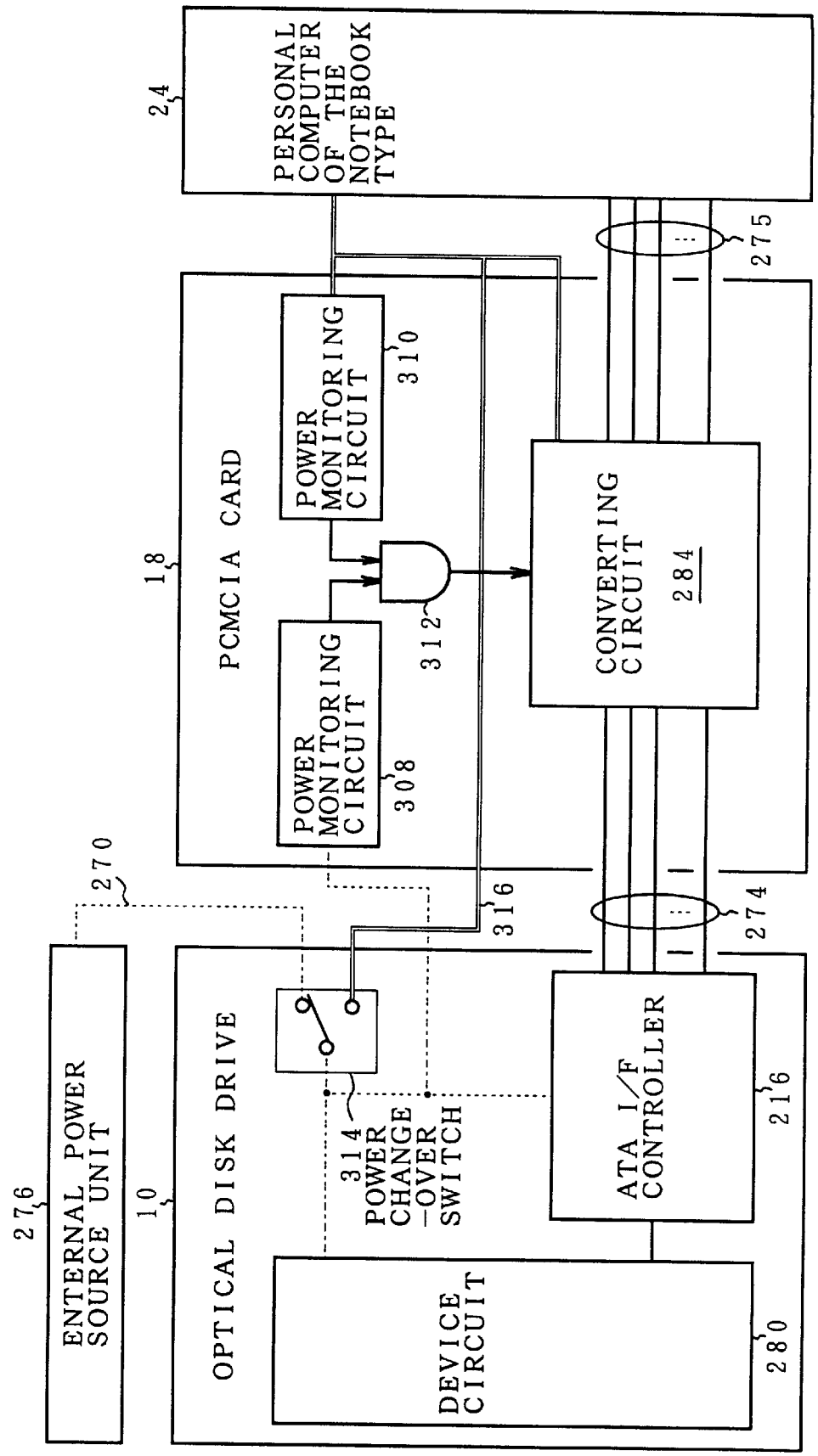
FIG. 25 is a circuit block diagram of another embodiment in which a power source change-over switch for switching an external power source and a host power source is provided on the device side in FIG. 24.

FIG. 25 shows a modification of FIG. 24 and is characterized in that, further, when the power supply from the external power source unit 276 on the device side cannot be performed to the optical disk drive 10, the optical disk drive 10 can be made operative by the power supply from the notebook-sized personal computer 24. Therefore, in addition to the construction of the PCMCIA card 18 in FIG. 25, a power source line 316 branched from the power source line 272 from the notebook-sized personal computer 24 is inputted to the optical disk drive 10 via the PCMCIA card 18. A power change-over switch 314 is provided for the optical disk drive 10. In the power change-over switch 314, the power source line 270 from the external power source unit 276 is connected to one switching terminal and the power source line 316 from the notebook-sized personal computer 24 via the PCMCIA card 18 is connected to the other switching terminal. By switching the power change-over switch 314 to the power source line 270 side as shown in the diagram until the battery voltage of the external power source unit 276 on the device side is extinguished, the optical disk drive 10 operates by the power supply from the external power source unit 276. When the battery voltage of the external power source unit 276 is consumed during the use and a low battery alarm or the like is generated, the power change-over switch 314 is switched to the power source line 316 side. Thus, the power supply from the notebook-sized personal computer 24 is performed to the optical disk drive 10 via the PCMCIA card 18. As for the operation of the optical disk drive 10 by the power supply from the notebook-sized personal computer 24, since the battery consumption on the notebook-sized personal computer 24 side is large, it is desirable to limit the use of the power supply from the personal computer 24 to a temporary use. In a case where the user forgets to bring the external power source unit 276 when carrying the optical disk drive 10 of the invention, by switching the power change-over switch 314 to the host side, the use of the optical disk drive by the power supply from the notebook-sized personal computer 24 is enabled.

[Detection of Low Battery]

Figure 26:
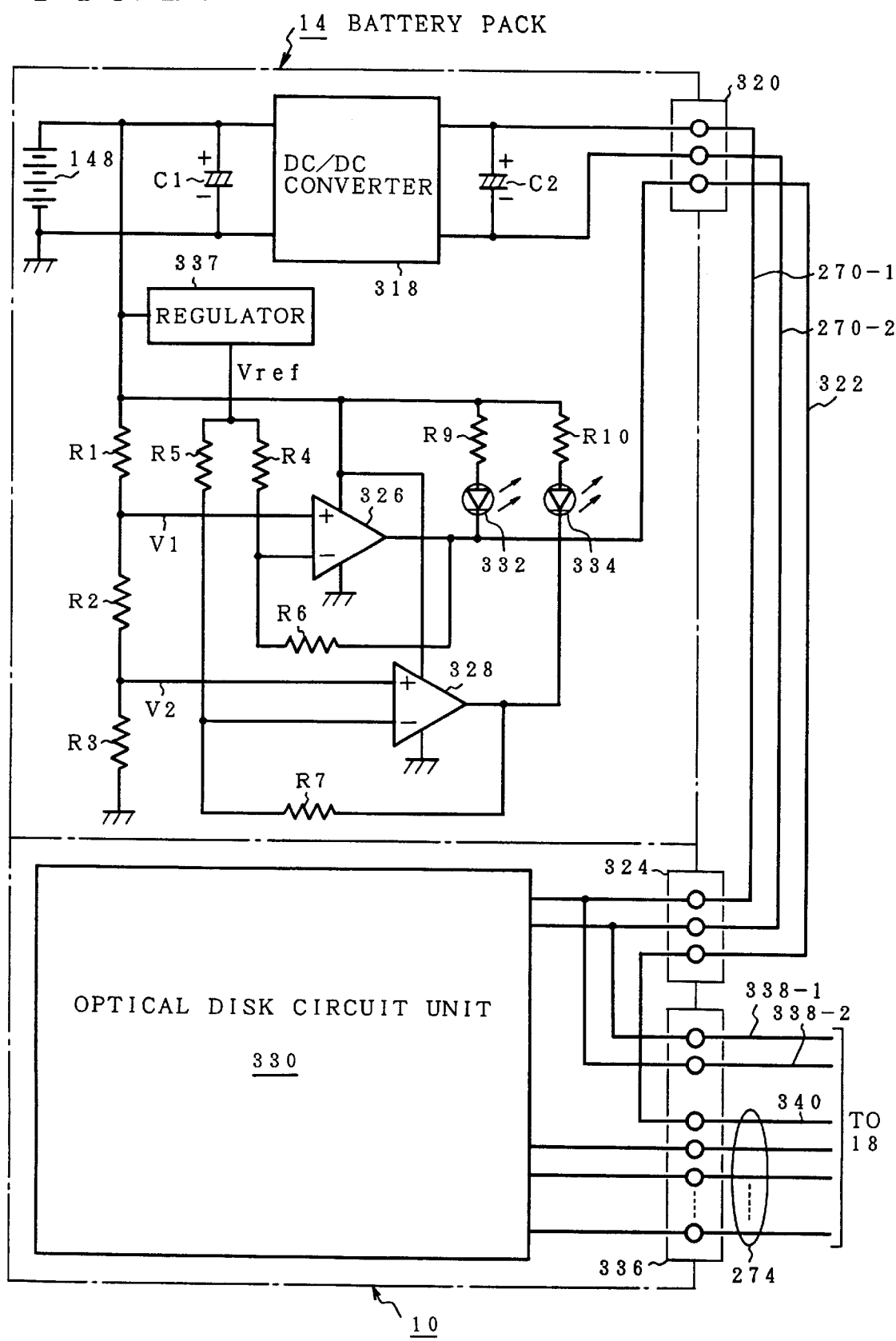
FIG. 26 is a circuit diagram of an abnormality detecting circuit of the battery pack which is used in the invention and a connection construction to the device and host.

FIG. 26 is a circuit block diagram for realizing a countermeasure process for the battery voltage extinction of the battery pack provided as an accessory of the optical disk drive of the invention. The battery cell 148 is provided in the battery pack 14. An output voltage from the battery cell 148 is converted and stabilized into, for example, 5 DCV by a DC/DC converter 318. The battery pack 14 is connected to a connector 324 of the optical disk drive 10 by power source lines 270-1 and 270-2 by a connector 320 and supplies a power source to an optical disk circuit unit 330. The DC/DC converter 318 has capacitors C1 and C2 for smoothing and backing up at the input stage and the output stage. The battery pack 14 has a comparator 326 to detect an abnormality such as a low battery and a comparator 328 to detect a normality of the battery cell. A predetermined reference voltage Vref formed by a regulator 337 is connected to plus (+) input terminals of the comparators 326 and 328 through resistors R4 and R5, respectively. The comparators 326 and 328 have hysteresis characteristics by feedback connecting from outputs to reference voltage input terminals through resistors R6 and R7, respectively. The battery voltage of the battery cell 148 is supplied to a voltage dividing circuit constructed by serially connecting resistors R1, R2, and R3. A voltage V1 at a node of the resistors R1 and R2 is connected to the (+) input terminal of the comparator 326 for detecting a low battery. A voltage V2 at a node of the resistors R2 and R3 is connected to a minus (−) input terminal of the comparator 328 for detecting a completion of the charging. An LED 332 for an alarm of the low battery is connected to an output of the comparator 326 through a resistor R9. An LED 334 for displaying a full charging is connected to an output of the comparator 328 for detecting a normality of the battery cell through a resistor R10. The output of the comparator 326 for detecting the low battery is further connected to the connector 324 of the optical disk drive 10 from the connector 320 through a low battery abnormality signal line 322 and is connected to the optical disk circuit unit 330. Further, the low battery abnormality signal line 322 is connected to the host side as one of the ATA interface signal lines 274 for the PCMCIA card 18. Further, the power source lines 270-1 and 270-2 from the battery pack 14 are also taken out as power source lines 338-1 and 338-2 from an interface connector 336 to the PCMCIA card 18 side.

Figure 27A:
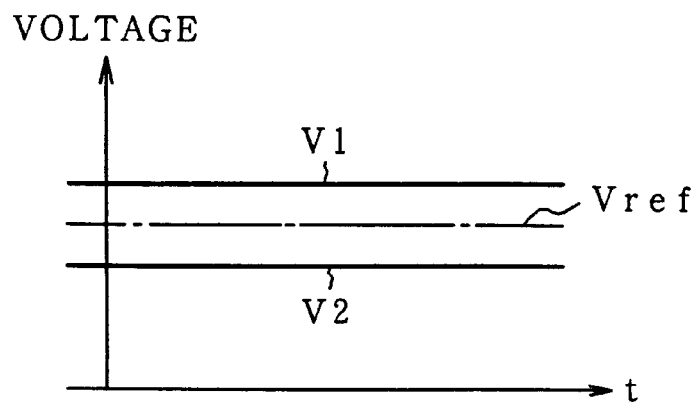
FIGS. 27A and 27B are explanatory diagrams of a comparing operation by the abnormality detecting circuit in FIG. 26 for a change in battery voltage.
Figure 27B:
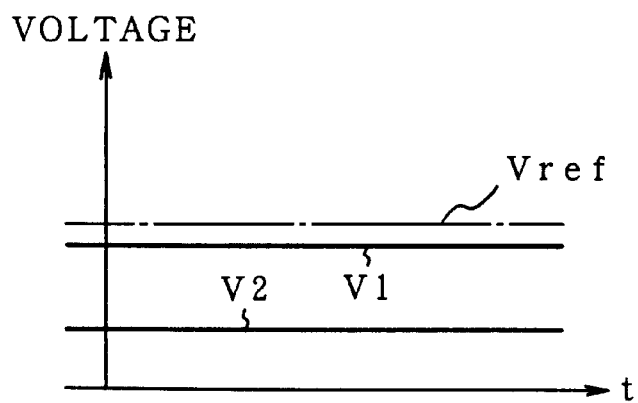

The monitoring operation by the comparator 326 for detecting a low battery and the comparator 328 for detecting a completion of the charging which are provided for the battery pack 14 in FIG. 26 will now be described. FIG. 27A shows the input voltages V1 and V2 to the comparators 326 and 328 for the predetermined reference voltage Vref when the battery voltage of the battery cell 148 lies within a normal range. First, since the input voltage V1 to the comparator 326 exceeds the reference voltage Vref, the output of the comparator 326 is at the H level and the LED 332 for alarming the low battery is lit off. On the other hand, since the input voltage V2 is lower than the reference voltage Vref, the output of the comparator 328 is set to the L level and the LED 334 for displaying a normality is lit on. When the battery cell 148 is subsequently consumed and the battery voltage drops, as shown in FIG. 27B, the input voltage V1 is also equal to or less than the reference voltage Vref and the output of the comparator 326 is inverted to the L level, thereby lighting on the LED 332 for alarming the low battery. At the same time, by pulling the low battery abnormality signal line 322 to the L level, a low battery abnormality detection signal is sent to the optical disk circuit unit 330 of the optical disk drive 10, thereby notifying the personal computer on the host side of the detection of the low battery abnormality of the battery pack 14 via the PCMCIA card 18. The optical disk circuit unit 330 of the optical disk drive 10 which received the low battery abnormality detection signal from the battery pack 14 stops the reading operation and the writing operation and, further, activates the ejection motor, thereby allowing the medium to be ejected. Thus, even if the power supply is shut off due to the battery voltage extinction from the battery pack 14 after the low battery abnormality was detected, a situation such that the data or medium is broken in the optical disk drive 10 can be certainly prevented. On the other hand, even in the notebook-sized personal computer on the host side as well, since the notification of the detection of the low battery abnormality is received via the PCMCIA card 18, even if a device error occurs in response to the access from the host side because the reading and writing operations are stopped and the medium is ejected on the optical disk drive 10 side, a message indicating that its cause is based on the detection of the low battery abnormality of the battery pack 14 can be displayed on the display or the like and informed to the operator.

In the battery pack 14 in FIG. 26, the common reference voltage Vref is inputted to the comparators 326 and 328, the battery voltage is divided into two stages by the voltage dividing circuit, and the divided voltages are respectively inputted, thereby performing a comparison discrimination. However, it is also possible to use another circuit construction such that corresponding different reference voltages for detection of the low battery and for the normal operation are respectively inputted to the comparators 326 and 328 and the divided voltage of the battery voltage is commonly inputted thereto in correspondence to them and the comparison is performed.

[Interface Unit]

Figure 28:
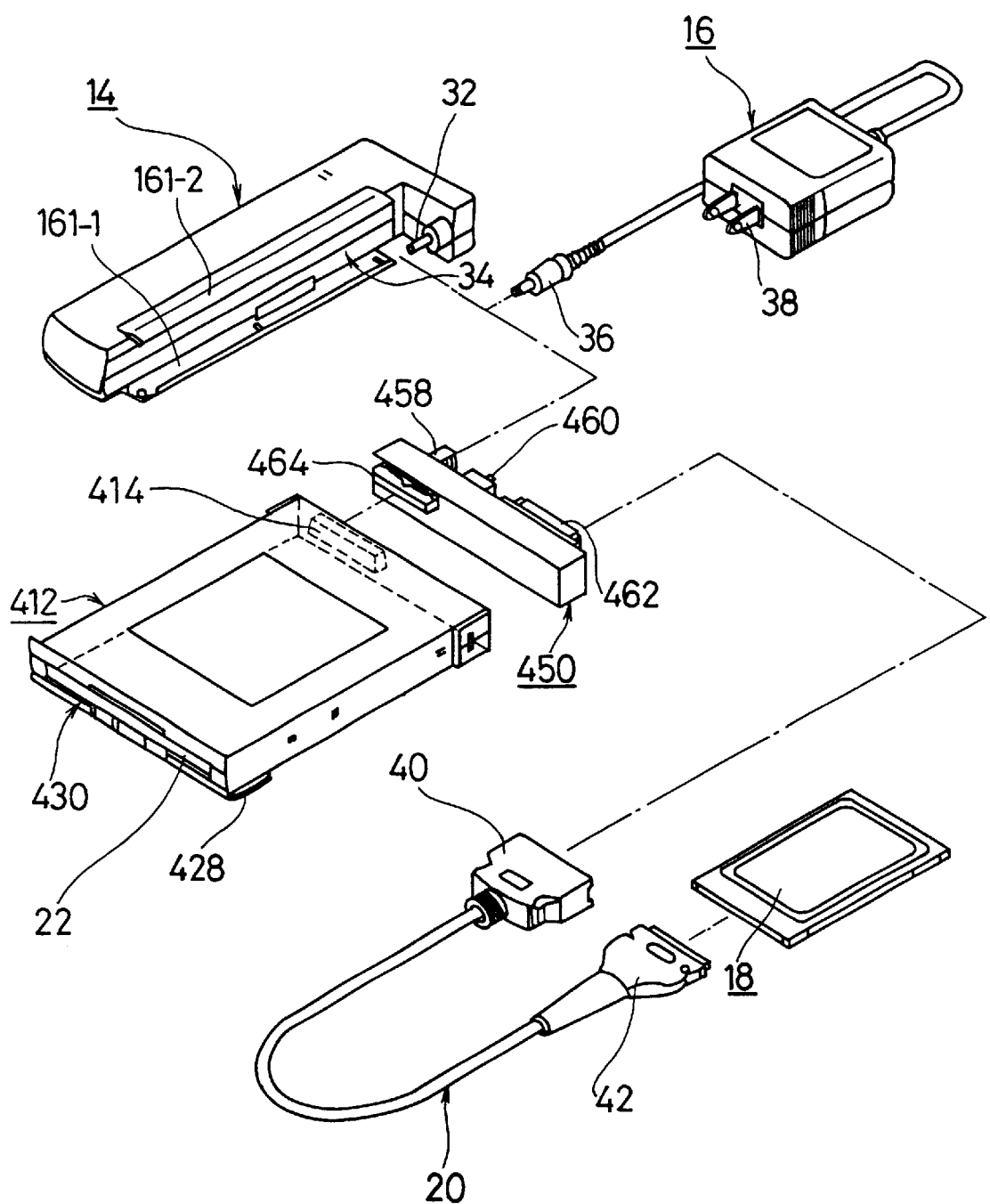
FIG. 28 is an explanatory diagram of another embodiment of an apparatus main body and a construction of accessories in an optical disk drive of the invention.
Figure 29:
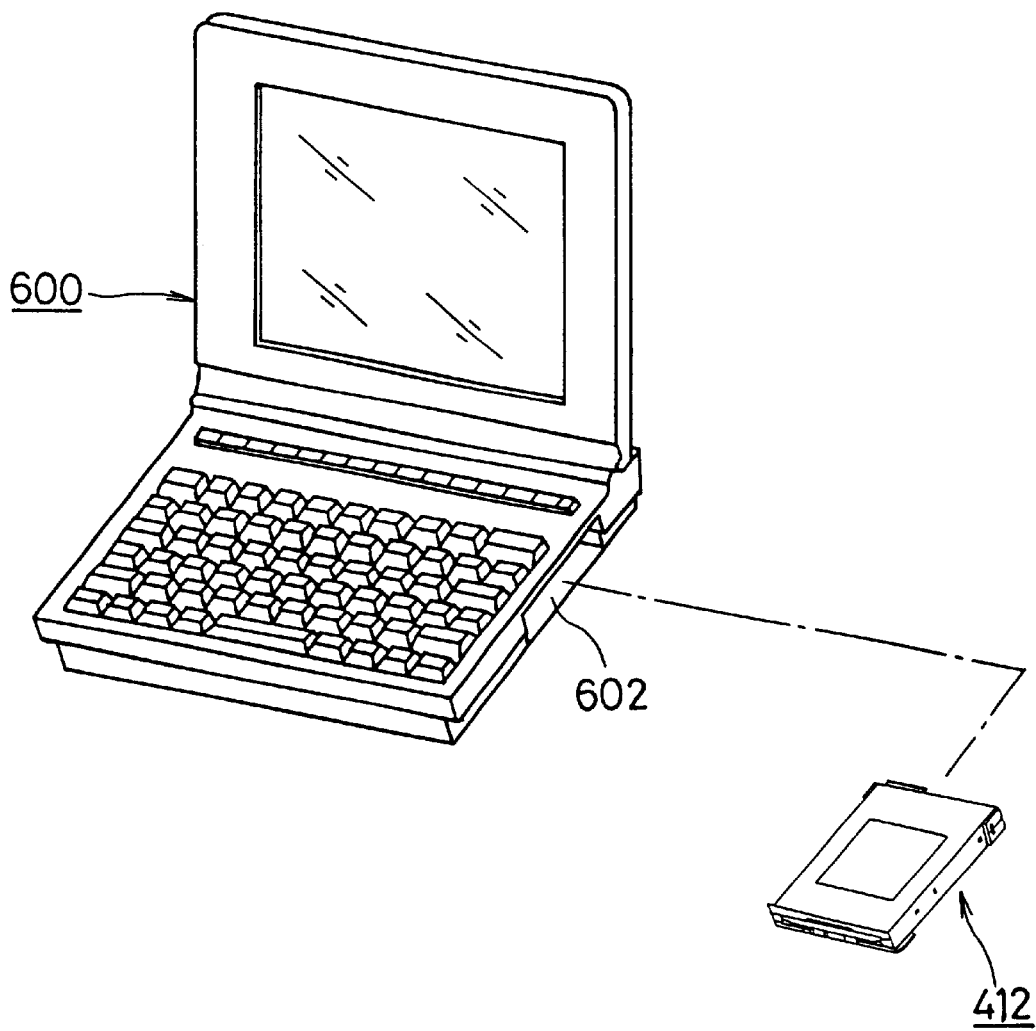
FIG. 29 is an explanatory diagram of a using state in the case where the optical disk drive corresponds to an ATA interface of a personal computer.
Figure 30:
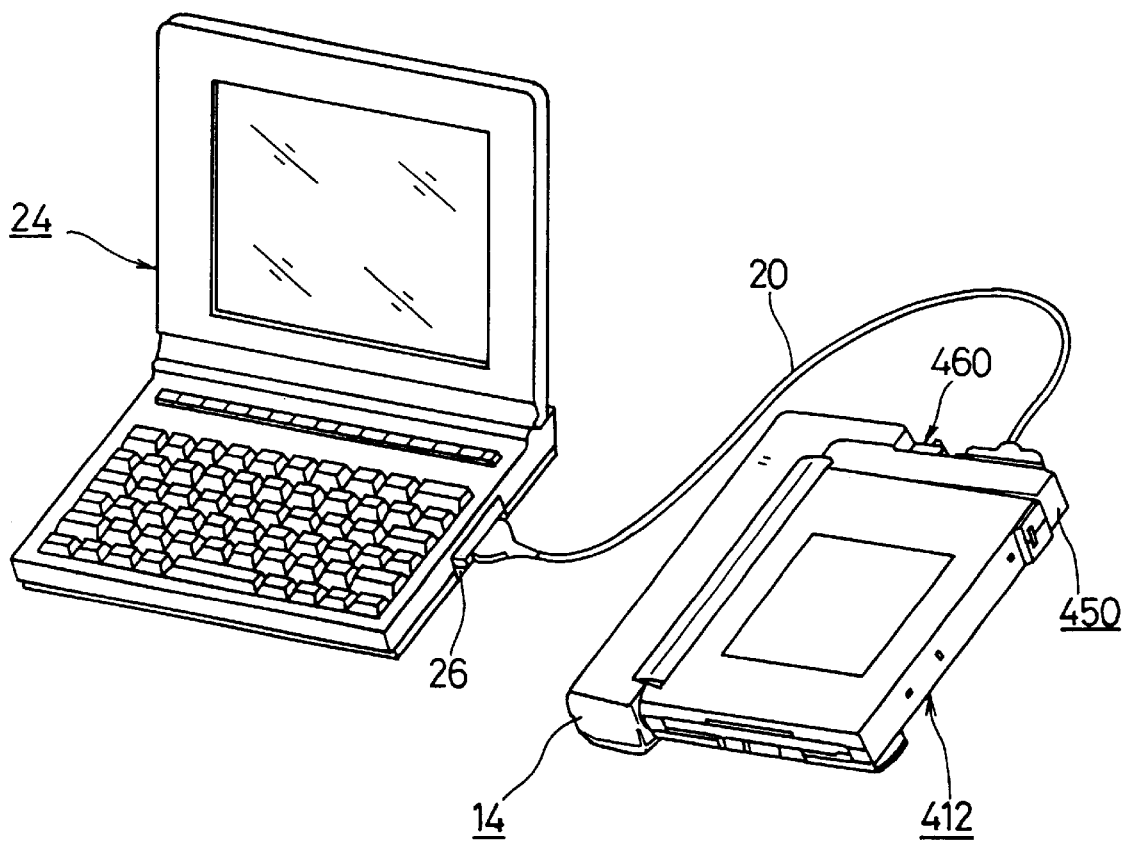
FIG. 30 is an explanatory diagram of a using state in the case where the optical disk drive corresponds to a card interface of a personal computer.

FIG. 28 shows a whole construction of another embodiment including accessories of the optical disk drive 10 of the invention. The embodiment is characterized in that the optical disk drive is set to a general type and either one of a mode in which the optical disk drive is set into a personal computer main body and is used and a mode in which the optical disk drive is connected by an interface card and is used can be selected in correspondence with an interface function equipped to an upper apparatus such as a personal computer or the like. First, an optical disk drive 412 has an E-IDE connector 414 corresponding to an ATA interface at a rear position. When the personal computer as an upper apparatus corresponds to the ATA interface, for instance, as shown in FIG. 29, the optical disk drive 412 is inserted and connected to a drive slot 602 provided in a notebook-sized personal computer 600 corresponding to the ATA interface and is used. In place of the drive, a battery pack can be also set to the drive slot 602. On the other hand, in the case where the personal computer as an upper apparatus corresponds to a PCMCIA interface, as shown in FIG. 30, an interface unit 450 is connected to the E-IDE connector 414 of the optical disk drive 412, the PCMCIA card 18 is connected to the interface unit 450 by the connector cable 20 for the card, and the PCMCIA card 18 is set into the card slot 26 of the notebook-sized personal computer 24 corresponding to the PCMCIA interface. The PCMCIA card 18 has therein an interface converting circuit for obtaining a compatibility between the ATA interface on the drive main body 12 side and the PCMCIA interface on the notebook-sized personal computer 24 side. The optical disk drive 412 can be used as an external storage of the notebook-sized personal computer 24. The interface unit 450 has a connector 464 for driving corresponding to the ATA interface in a front portion. By connecting the connector 464 for driving to the E-IDE connector 414 of the optical disk drive 412, it is electrically and mechanically connected to the rear side of the optical disk drive 412. A jack 458 for a DC plug, a power switch 460, and a connector 462 for a card are provided on the rear side of the interface unit 450. The DC plug 36 of the AC adaptor 16 having the AC plug 38 or the DC plug 32 of the battery pack 14 is connected to the jack 458 for the DC plug. The main body plug 40 of the connector cable 20 for the card is connected to the connector 462 for the card. The card plug 42 on the opposite side of the connector cable 20 for the card is connected to the PCMCIA card 18. The power switch 460 switches a power supply from the jack 458 for the DC plug to the optical disk drive 412 and a power supply from the connector 462 for the card. The battery pack 14 has therein, for example, four SUM-3 batteries and is attached to the side surface of the optical disk drive 412 by the engaging portion 34. At the same time, the DC plug 32 is inserted into the jack 458 for the DC plug in the rear portion of the drive main body 12. The pair of pressing plates 161-1 and 161-2 are projected from the upper and lower portions of the engaging portion 34 of the battery pack 14 and are inserted and connected into the jack 458 for the DC plug of the DC plug 32, so that they are supported and fixed to the optical disk drive 412 at at least three points.

Figure 31:
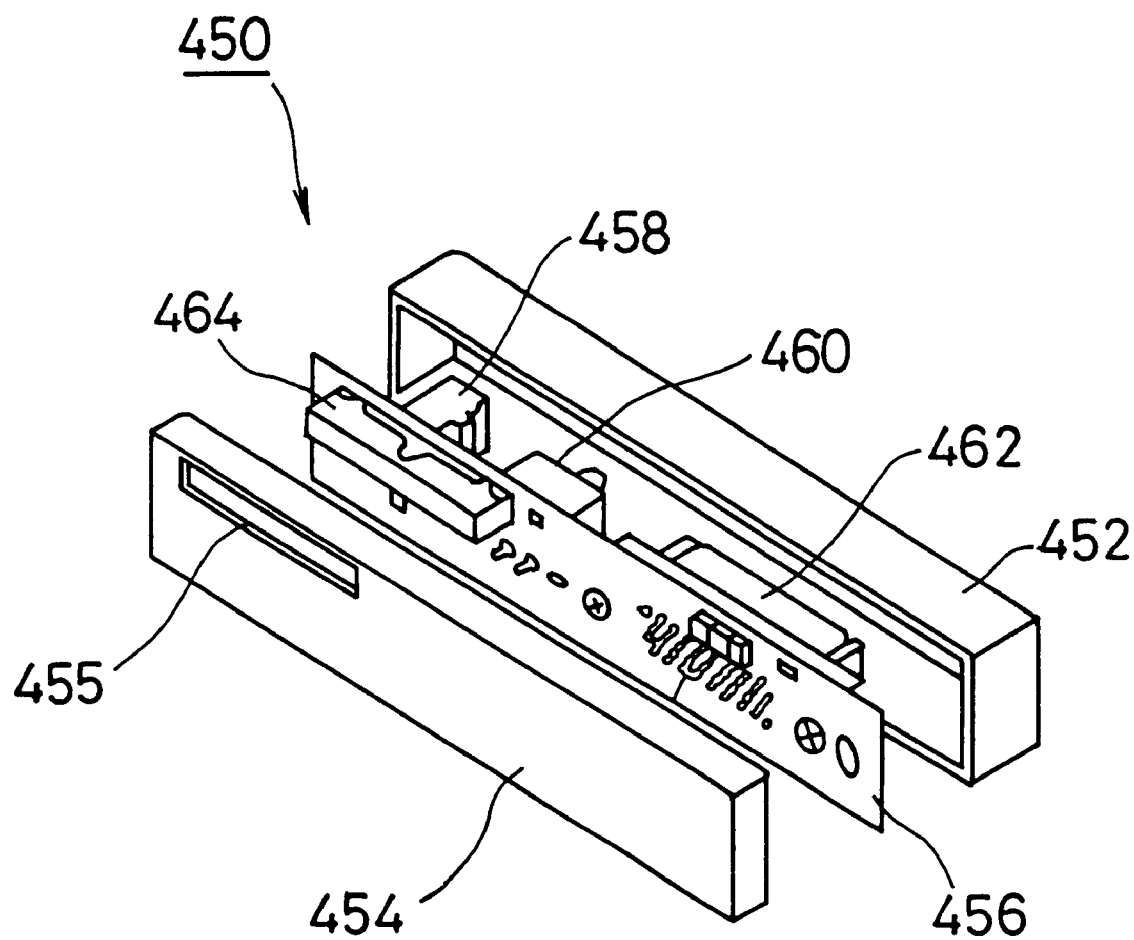
FIG. 31 is an assembly exploded diagram of an interface unit in FIG. 28.

FIG. 31 is an assembly exploded diagram of the interface unit 450 in FIG. 28. The interface unit 450 has casings 452 and 454 of a split structure and encloses therein a printed circuit board 456 for relay. The connector 464 for driving is attached to the driving side of the printed circuit board 456 for relay and is taken out to the driving side from a connector ejecting port 455 in an assembling state of the casings 452 and 454. The jack 458 for the DC plug, power switch 460, and connector 462 for the card are provided on the back surface side of the printed circuit board 456 for relay.

Figure 32:
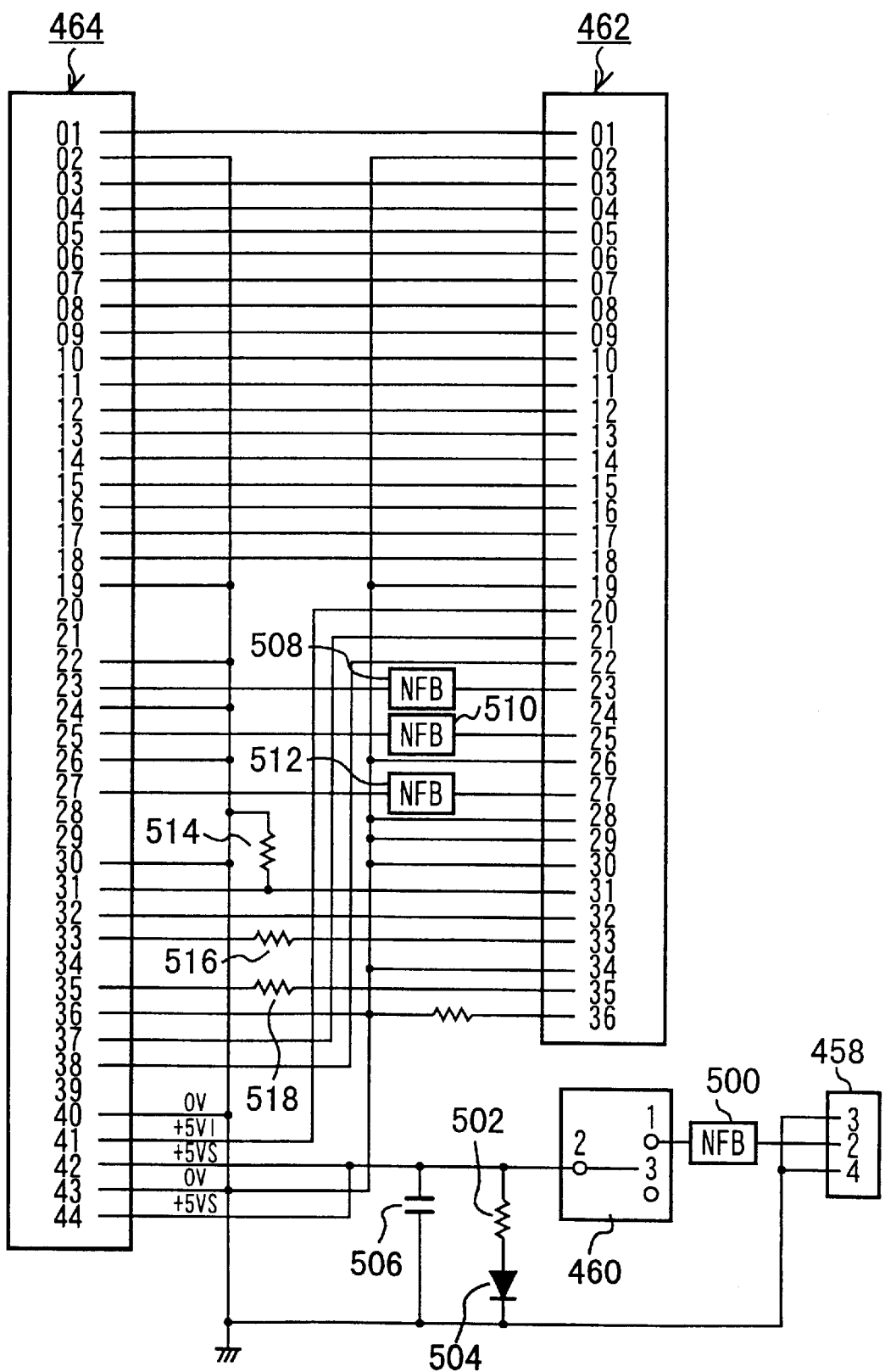
FIG. 32 is a circuit diagram of the interface unit in FIG. 28.

FIG. 32 is a circuit diagram of the interface unit in FIG. 28. The connector 462 for the card corresponding to the PCMCIA interface is a connector with 36 pins, the 20th pin is used as a +5V line, and the 02nd, 19th, 21st, 26th, 30th, and 34th pins are commonly connected and are used as a 0V line. The connector for driving corresponding to the ATA interface is a connector with 44 pins, the 40th to 44th pins are used for supplying a power source, and the remaining pins are used for an interface signal. Among the 40th to 44th pins, the 41st pin is connected to the 20th pin of the connector 462 for the card and supplies +5 V to the driving side. The 40th and 43rd pins are commonly connected as a 0V line. The 42nd pin is connected to the jack 458 for the DC plug through the power switch 460. When the power switch 460 is switched to the first terminal, the 42nd pin receives the power supply of +5 V from the second terminal of the jack 458 for the DC plug. The common sides serving as third and fourth terminals of the jack 458 for the DC plug are commonly connected to the 0 V line of the connector 464 for driving by the circuit of the printed circuit board for relay. A filter circuit for absorbing a surge current having a register 502, a diode 504, and a capacitor 506 is connected to a power supply line between the power switch 460 and connector 464 for driving. No-fuse breakers (NFBs) for opening the line in case of an overcurrent are inserted and connected between the power switch 460 and jack 458 for the DC plug and to connecting lines between the connector 462 for the card and the 23rd, 25th, and 27th pins of the connector 464 for driving, respectively. Resistors 516 and 518 for a current limitation are inserted and connected to the connecting lines of the 33rd and 35th pins. Further, the connecting line of the 31st pin is pulled down to the 0 V line by a resistor 514.

As mentioned above, in the case where the optical disk drive is of the general type and the interface equipped to the upper apparats such as a personal computer or the like is the ATA interface, the optical disk drive is directly connected via a cable. In the case where the interface is the PCMCIA interface, the interface card is connected by using the interface unit and can be used. The connecting form of the optical disk drive can be properly selected in accordance with the difference of the interface of the upper apparatus. In case of using the interface unit, the power supply from the upper apparatus by the PCMCIA interface and the power supply from the jack for the DC plug by the battery pack can be switched as necessary. For example, when the personal computer as an upper apparatus is a portable type which is driven by a battery, by switching the power supplying mode to the power supply from the jack for the DC plug, a reduction of the battery life of the upper apparatus when using the external storage can be suppressed.

According to the invention as mentioned above, with respect to the optical disk drive of the invention in which the drive main body, battery pack, interface card, and connector cable are carried as one set, the other accessories are integratedly assembled and supported to the drive main body and can be packaged by using the motor member. Therefore, when the optical disk drive is carried together with the notebook-sized personal computer or the like serving as a host, they can be extremely easily enclosed into and taken out from a bag or the like. A situation such that the user forgets to carry the necessary accessories and the apparatus cannot be used can be also certainly prevented.

Since the lid member is provided at the medium insertion port of the drive main body, a situation such that the drive and medium are broken by the insertion of a foreign material during the carrying can be certainly prevented and the reliability upon carrying can be improved. Since the lid member provided at the medium insertion port of the drive main body is rotated downward and a function as a supporting plate for lifting the medium insertion port upward is provided, even in a thin drive main body, the medium insertion port is allowed to face upward, thereby enabling the medium to be easily inserted and taken out.

When the interface card having the interface converting circuit is used and connected in order to it obtain a compatibility between the device side interface of the optical disk drive and the host side interface, the power supply on the device side and the power supply on the host side are individually executed. Therefore, as for the unnecessary current flow to the stop side via the interface signal line when the power supply on one side is executed, the mutual connection by the interface signal lines is disconnected with respect to the one sided power source and, only when the power supplies on both sides are executed, the connecting relation of the interface signal lines is formed. Thus, a current consumption by the unnecessary current flow when the power supply on one side is performed is suppressed and the shortage of the battery using times on the device and host sides can be prevented.

Further, the drop of the battery voltage is detected, the abnormality detection signal is sent to the battery pack, and such a state is notified to the host side via the optical disk drive and the interface card. Therefore, with respect to the power supply to the optical disk drive, even if a battery voltage extinction occurs in the battery pack, the low battery abnormality is detected before the battery voltage extinction and the stop of the reading and writing operations and the ejection of the medium are automatically executed. A situation such that the data or medium is broken by the battery voltage extinction can be certainly prevented.

Since the notification of the low battery abnormality detection is also performed to the host side via the interface signal line, when the optical disk drive is stopped due to the battery voltage extinction, its cause can be easily known even on the host side and a countermeasure such as a battery charging or the like can be properly performed.

The above embodiments have been shown and described as an example with regard to the case where for the ATA interface on the device side serving as an optical disk drive, the interface on the host side serving as a notebook-sized personal computer is set to the PCMCIA interface. However, the invention can be also similarly applied to other proper interfaces such as SCSI-II and the like on the device side.

What is claimed is:

1. A storage apparatus which is externally attached to an upper apparatus through an interface card, comprising:
    a main drive body having at least one terminal which can be connected to one end of a connector cable, the interface card capable of being connected to the other end of said connector cable;
    a holder attachable to and detachable from said main drive body, said holder having a pair of engaging portions for engaging opposing sides of said main drive body, wherein at least one of said engaging portions can be engaged to one of said opposing sides of said main drive body, and said holder can secure at least one of said interface card and said connector cable to said main drive body even when said cable connector is disconnected from said terminal; and
    a battery pack including:
        a pack main body which is detachably attached to a side surface of said main drive body;
        a pair of pressing plates which are projected from upper and lower portions of said pack main body toward the side surface of the main drive body and sandwich the main drive body from the upper and lower sides, thereby supporting said pack main body;
        a plug supporting portion which is extending from a rear portion of said pack main body to a rear surface direction of said main drive body; and
        a plug which is projected to the inside of said plug supporting portion and is inserted into a jack hole of said main drive body,
        and wherein said battery pack is supported and fixed to said main drive body at at least three points of said pair of pressing plates and the insertion of said plug into the jack hole.

2. An apparatus according to claim 1, wherein a guide knob is projected to the inside of the pressing plate on the bottom side of said battery pack, a guide groove is formed on a bottom surface of said main drive body in correspondence to said guide knob, and said guide groove is constructed in a manner such that an engaging guide groove directing forward is continuously formed subsequent to a leading guide groove in the side surface direction and by guiding and moving said guide knob along said guide groove, the supporting fixing state by at least said three points of said pair of pressing plates and the insertion of said plug into the jack hole is formed.

3. An apparatus according to claim 2, wherein said lid member is constructed by said battery pack and said battery pack is detachably provided at the apparatus front surface in which said medium insertion port of said main drive body is opened.

4. A storage apparatus comprising:
    a main drive body for optically recording and/or reproducing information to/from an interchangeable medium;
    a battery pack which is detachably attached to said main drive body and supplies an operating power source from a built-in battery cell to only said main drive body;
    a closable lid member provided at a front surface of said apparatus in which a medium insertion port of said main drive body is opened; and
    a hinge in which one end is rotatably axially supported to said lid member and the other end is rotatable axially supported to a lower side portion of said main drive body and which supports said medium insertion port at a position where it is lifted from an installing surface of said main drive body in a state in which said lid member is opened and rotated to a position below a bottom surface of said main drive body.

5. An apparatus according to claim 4, further comprising a battery pack, and
    wherein said battery pack comprises:
        a pack main body which is detachably attached to a side surface of said main drive body;
        a pair of pressing plates which are projected from upper and lower portions of said pack main body toward the side surface of the main drive body and sandwich the main drive body from the upper and lower sides, thereby supporting said pack main body;
        a plug supporting portion which is extending from a rear portion of said pack main body to a rear surface direction of said main drive body; and
        a plug which is projected to the inside of said plug supporting portion and is inserted into a jack hole of said main drive body,
        and wherein said battery pack is supported and fixed to said main drive body at at least three points of said pair of pressing plates and the insertion of said plug into the jack hole.

6. An apparatus according to claim 5, wherein a guide knob is projected to the inside of the pressing plate on the bottom side of said battery pack, a guide groove is formed on a bottom surface of said main drive body in correspondence to said guide knob, and said guide groove is constructed in a manner such that an engaging guide groove directing forward is continuously formed subsequent to a leading guide groove in the side surface direction and by guiding and moving said guide knob along said guide groove, the supporting fixing state by at least said three points of said pair of pressing plates and the insertion of said plug into the jack hole is formed.

7. A storage apparatus comprising:
    a main drive body for accessing information to an interchangable medium;
    an external power source unit for supplying a power source to said main drive body;
    an interface power source unit for receiving a power source from an interface of an upper apparatus; and
    a power source monitoring unit for monitoring both of the power supply from said external power source unit to said main drive body and the power supply from said upper apparatus via said interface power source unit and for allowing said external power source unit to supply power to said main drive body when both of the power supplies are detected.

8. An apparatus according to claim 7, wherein a power change-over switch for switching the power supply from said external power source unit and the power supply from said upper apparatus via said interface is further provided for said main drive body.

9. An apparatus according to claim 7, wherein said first interface of said main drive body is an ATA interface and said second interface of said upper apparatus is a PCMCIA interface.

10. A storage apparatus comprising:
- a drive for accessing information to an interchangeable medium;
- an interface unit which connects an external power supply unit and an interface of an upper apparatus to said drive; and
- a snapping member for attaching and detaching said interface unit;

wherein said interface unit includes:
- a power supply unit in which a power plug of said external power supply unit is connected,
- a connector for a cable for connecting to said interface of said upper apparatus, and
- a power switch for switching between a supply of power from said upper apparatus and a supply of power from said external power supply unit;

wherein said external power supply unit is a battery pack which is detachably provided for said drive and supplies an operation power source from a built-in battery;

wherein said battery pack includes:
- a pack main body which is detachably attached to a side surface of said drive;
- a pair of pressing plates which are projected from upper and lower positions of said pack main body toward the side surface of said drive and sandwich said drive from upper and lower positions, thereby supporting said pack main body;
- a plug supporting portion extending from a rear portion of said pack main body in a rear surface direction of said drive; and
- a plug which is projected to the inside of said plug supporting portion and is inserted into a jack hole of said drive, and further wherein said battery pack is supported and fixed to said drive at at least three points by said pair of pressing plates and the insertion of said plug into said jack hole.

11. A storage apparatus which is externally attached to an upper apparatus, comprising:
- a main drive body for accessing information to a medium, said main drive body having first and second terminals;
- a battery pack which is detachably attached to the first terminal of said main drive body and supplies an operating power source to said main drive body;
- an interface card which is detachably attached to said upper apparatus;
- a connector cable which is detachably attached to the second terminal of said main body and connects said main drive body to said interface card; and
- a holder for detachably supporting said interface card removed from said upper apparatus and said connector cable removed from the second terminal of said main drive body onto said main drive body, wherein said battery pack has a pack main body which is detachably attached to a side surface of said main drive body;

a pair of pressing plates which are projected from upper and lower portions of said pack main body toward the side surface of the main drive body and sandwich the main drive body from the upper and lower sides thereby supporting said pack main body;

a plug supporting portion extending from a rear portion of said pack main body to a rear surface direction of said main drive body; and a plug which is projected from the inside of said plug supporting portion and is inserted into a jack hole of said main drive body, wherein said battery pack is supported and fixed to said main body at at least three points of said pair of pressing plates and at the insertion of said plug into the jack hole.

12. A storage apparatus having a main drive body for accessing information to a medium, comprising:
- a battery pack which is detachably attached to the main drive body and supplied an operating power source to said main drive body;
- a pack main body which is detachably attached to a side surface of said main drive body;
- a pair of pressing plates which are projected from upper and lower portions of said pack main body toward the side surface of the main drive body and sandwich the main drive body from the upper and lower sides, thereby supporting said pack main body;
- a plug supporting portion extending from a rear portion of said pack main body to a rear surface direction of said main drive body; and
- a plug which is projected to the inside of said plug supporting portion and is inserted into a jack hole of said main drive body, and wherein said battery pack is supported and fixed to said main drive body at at least three points of said pair of pressing plates and at the insertion of said plug into the jack hole.

* * * * *